United States Patent
Hsu

[19]

[11] Patent Number: 6,083,636
[45] Date of Patent: Jul. 4, 2000

[54] FUEL CELL STACKS FOR ULTRA-HIGH EFFICIENCY POWER SYSTEMS

[75] Inventor: Michael S. Hsu, Lincoln, Mass.

[73] Assignee: Ztek Corporation, Waltham, Mass.

[21] Appl. No.: 09/184,630

[22] Filed: Nov. 2, 1998

Related U.S. Application Data

[63] Continuation-in-part of application No. 08/977,835, Nov. 26, 1997, Pat. No. 5,976,332, which is a continuation of application No. 08/325,486, Oct. 19, 1994, Pat. No. 5,693,201, which is a continuation-in-part of application No. 08/287,093, Aug. 8, 1994, Pat. No. 5,501,781.

[51] Int. Cl.[7] ............................. H01M 8/00; H01M 8/14; H01M 8/04; H01M 8/18; H01M 8/10
[52] U.S. Cl. ................................. 429/13; 429/16; 429/17; 429/20; 429/24; 429/31; 429/33
[58] Field of Search ........................... 429/13, 16, 17–20, 429/31, 33, 24

[56] References Cited

U.S. PATENT DOCUMENTS

| | | | |
|---|---|---|---|
| 4,721,556 | 1/1988 | Hsu | 204/258 |
| 4,722,873 | 2/1988 | Matsumura | 429/24 |
| 4,812,373 | 3/1989 | Grimble et al. | 429/19 |
| 4,853,100 | 8/1989 | Hsu | 204/256 |
| 5,221,586 | 6/1993 | Morimoto et al. | 429/20 |
| 5,230,849 | 7/1993 | Hsu | 264/104 |
| 5,306,575 | 4/1994 | Camara et al. | 429/16 |
| 5,332,630 | 7/1994 | Hsu | 429/20 |
| 5,338,622 | 8/1994 | Hsu et al. | 429/26 |
| 5,413,878 | 5/1995 | Williams et al. | 429/16 |
| 5,462,817 | 10/1995 | Hsu | 429/19 |
| 5,500,306 | 3/1996 | Hsu et al. | 429/17 |
| 5,501,781 | 3/1996 | Hsu et al. | 204/269 |
| 5,693,201 | 12/1997 | Hsu et al. | 204/241 |
| 5,747,185 | 5/1998 | Hsu | 429/44 |

*Primary Examiner*—Donald R. Valentine
*Attorney, Agent, or Firm*—Lahive & Cockfield, LLP; Anthony A. Laurentano

[57] ABSTRACT

A system and method for producing electricity with a fuel cell power system. The power system includes an assembly of fuel cell stacks that operate at different temperatures, which vary between two or more of the fuel cell stacks. The fuel cell stack can have multiple temperature regions formed axially along the stack, or a plurality of spatially separated fuel cell stacks can be employed to heat a reactant from an input temperature to a desired temperature. The fuel cell stacks have operating temperatures in the range between about 20° C. and about 2000° C.

83 Claims, 11 Drawing Sheets

FUEL CELL STACKS FOR ULTRA-HIGH EFFICIENCY POWER SYSTEMS

RELATED PATENT APPLICATIONS

This patent application is a continuation-in-part patent application of U.S. Ser. No. 08/977,835, filed Nov. 26, 1997, entitled Ultra High Efficiency Turbine and Fuel Cell Combination; now U.S. Pat. No. 5,976,332, which is a continuation application of U.S. Ser. No. 08/325,486, filed Oct. 19, 1994, entitled Ultra High Efficiency Turbine and Fuel Cell Combination, now U.S. Pat. No. 5,693,201; which is a continuation-in-part application of U.S. Ser. No. 08/287,093, filed Aug. 8, 1994, entitled Electrochemical Converter Having Internal Thermal Integration, now U.S. Pat. No. 5,501,781.

BACKGROUND OF THE INVENTION

This invention relates to fuel cells and its used in connection with gas turbines, steam turbines, and heating, ventilation and air conditioning (HVAC) systems, and specifically to high performance hybrid power systems employing such devices.

Conventional high performance gas turbine power systems exist and are known. Prior gas turbine power systems include a compressor, a combustor, and a mechanical turbine, typically connected in-line, e.g., connected along the same axis. In a conventional gas turbine, air enters the compressor and exits at a desirable elevated pressure. This high-pressure air stream enters the combustor, where it reacts with fuel, and is heated to a selected elevated temperature. This heated gas stream then enters the gas turbine and expands adiabatically, thereby performing work. One deficiency of gas turbines of this general type is that the turbine typically operates at relatively low system efficiencies, for example, around 25%, with systems of megawatt capacity.

One prior art method employed to overcome this problem is to employ a recuperator for recovering heat. This recovered heat is typically used to further heat the air stream prior to the stream entering the combustor. Typically, the recuperator improves the system efficiency of the gas turbine upwards to about 30%. A drawback of this solution is that the recuperator is relatively expensive and thus greatly adds to the overall cost of the power system.

Another prior art method employed is to operate the system at a relatively high pressure and a relatively high temperature to thereby increase system efficiency. However, the actual increase in system efficiency has been nominal, while the system is subjected to the costs associated with the high temperature and pressure mechanical components.

Still another prior art method utilized by plants having power capacities above 100 MW is to thermally couple the high temperature exhaust of the turbine with a heat recovery steam generator for a combined gas turbine/steam turbine application. This combined cycle application typically improves the system operating efficiency upwards to about 55%. However, this efficiency is still relatively low.

The overall power system performance is further predicated on the efficiency of the constituent fuel cells and associated cooling systems. The traditional method for fuel cell thermal management is to force high volumes of a cooling medium, either a liquid or gaseous coolant stream, through the fuel cell assembly. Cooling water is often employed for ambient temperature devices, and air can be employed for higher temperature fuel cells. In some instances, the same air which serves as the fuel cell's oxidant is used as a cooling medium as well. The cooling medium passes through the fuel cell and carries off the thermal energy by its sensible heat capacity. The volume flow of coolant required for this method is inversely related to the limited temperature operating range of the electrochemical operation of the electrolyte, or in the case of fuel cells with ceramic components, by constraints associated with thermal stress.

The foregoing heat capacity limitations on the amount of temperature rise of the cooling medium result in coolant flow rates through the fuel cell much higher than those required by the electrochemical reaction alone. Since these relatively large flow quantities must be preheated to a temperature at or near the operating temperature of the fuel cell and circulated therethrough, a dedicated reactant thermal management subsystem is required. Typically, the coolant is preheated to a temperature either at or near the fuel cell operating temperature, e.g., within 50° C. of the operating temperature. Such thermal management subsystems normally include equipment for regenerative heating, pumping, and processing of the excessive coolant flow. These components add substantially to the overall cost of the system.

For illustration purposes, consider a regenerative heat exchanger of a type suitable for preheating the fuel cell reactants and operating with a 100° C. temperature difference, and a typical heat transfer rate of 500 Btu/hr-ft$^2$ (0.13 W/cm$^2$). Further assuming a 50% cell efficiency with no excess coolant flow, and operating at an ambient pressure, the heat processing or heat transfer surface area of the regenerator would be of the same order of magnitude as the surface area of the fuel cell electrolyte. Considering an excess coolant flow requirement of 10 times the level required for the fuel cell reactant flow, a representative value for conventional approaches, the heat exchanger surface area would be 10 times larger than the active fuel cell surface area. The large size of this heat exchanger makes it difficult to integrate the heat exchanger with electrochemical converters to form a compact and efficient power system.

Furthermore, the high volume of cooling fluids being passed through the fuel cell makes the fuel cell unsuitable for direct integration with the gas turbine to achieve relatively high system efficiency.

Thus, there exists a need in the art for high performance power systems and for systems that provide for better thermal management approaches, especially for use in electrochemical or hybrid power energy systems. In particular, an improved power system, such as a gas turbine power system, that is capable of integrating and employing the desirable properties of electrochemical converters would represent a major improvement in the industry. More particularly, an integrated electrochemical converter assembly for use with a gas turbine system that reduces the costs associated with providing effective thermal processing approaches while significantly increasing the overall system power efficiency, would also represent a major improvement in the art.

SUMMARY OF THE INVENTION

The present invention relates to power systems, and specifically to fuel cell power systems. The efficiency of an operational power system can be assessed by either examining the efficiency of the system of by examining the inefficiency of the system. When examining the inefficiency of the system, the key physical quantity is the energy loss from the system through its gas effluence or exhaust.

Typically, fuel cell exhaust contains nitrogen, unreacted oxygen and combustion resultants such as water vapor and carbon dioxide. The energy content released through the exhaust is a function of the exhaust amount. In order to improve system efficiency, the reduction of system inefficiency can be achieved by minimizing the nitrogen content in the exhaust or the air consumption at the reactant inlet. Typically, the high temperature fuel cell system applies excess air (oxidant) for the removal of the exothermic heat release from the fuel cell reaction. The amount of air flow may be as much as five times as high as the stoichiometric requirements. The present invention employs multiple approaches to reduce the air requirements for fuel cell operation.

One approach is to employ a fuel cell that includes an integral lip structure formed on one of the fuel cell plates for heating the reactants as they pass through the fuel cell. The lip structure is described in detail below. The fuel cells employing this lip structure are effective in accommodating reactant temperature rises in excess of 100° C. and allowing reduced reactant amounts, thus realizing improved power system efficiency.

The other approach is to employ a fuel cell that includes multiple axially adjacent temperature regions or a collection of fuel cells that operate at different temperatures, for example, in a sequence of increasing temperatures. In this approach the reactants are introduced into the system at a relatively low temperature and exit at a relatively high temperature. The energy content associated with the temperature change of the reactants is used to cool the fuel cell. In order to maintain a constant power generation of the fuel cell and a fixed quantity of waste heat to be removed by the reactants, fuel cell power systems that operate with larger temperature rises require smaller reactant amounts. When air is utilized as the coolant, the low limit of air consumption for fuel cell operation is known as the stoichiometric rate. Typically, a fuel cell of one electrolyte type provides for only a 100° C. rise in temperature of the reactants when passing through the fuel cell. The fuel cell power systems of the present invention is able to accommodate reactant temperature rises in excess of 100° C., while employing reduced levels of reactant.

Additionally, the fuel cell power systems of the present invention allow the reactants to be heated under a generally isothermal state locally within the fuel cell. Thermodynamically, the isothermal heating incurs the least amount of entropy, which translates into high system efficiency, such as in the Brayton cycle depicted in FIGS. 5 and 6, in combination with the fuel cell performance. The low temperature fuel cell stack employed in the foregoing temperature cascaded fuel cell design, FIG. 6, has a higher electrochemical potential or a higher fuel cell efficiency than a fuel cell stack operated at a constant high temperature, FIG. 5.

The present invention provides for a system and method for producing electricity with a fuel cell power system. The power system includes an assembly of fuel cell stacks that operate at different temperatures, which vary between two or more of the fuel cell stacks. The system also includes structure for receiving reactants for electrochemically producing electricity. The fuel cell stacks have operating temperatures in the range between about 20° C. and about 2000° C.

According to one aspect, the fuel cell stacks can be a solid oxide fuel cell, solid state fuel cell, molten carbonate fuel cell, phosphoric acid fuel cell, alkaline fuel cell, or proton exchange membrane fuel cell. Further, the fuel cell stacks comprises a solid state or solid oxide material including yttria stabilized zirconia, a lanthanum gallate, a ceria based oxide, a bismuth based oxides, or a composite of the foregoing materials.

According to another aspect, the fuel cell stack includes a plurality of electrolyte plates having an oxidizer electrode material on one side and a fuel electrode material on the opposing side, and a plurality of interconnector plates for providing electrical contact with the electrolyte plates. The fuel cell stack is assembled by alternately stacking interconnector plates with the electrolyte plate. The fuel cell stacks further can include a plurality of manifolds axially associated with the stack and adapted to receive the reactants. In another aspect, a thermally conductive and integrally formed extended surface or lip of the interconnector plate protrudes into the axial manifolds to heat one or more of the reactants.

According to still another aspect, the fuel cell stack has a cylindrical or rectangular cross-sectional shape, or comprises an array of tubular shaped fuel cells.

According to still another aspect, the exhaust generated by one fuel cell stack is introduced into another fuel cell stack, and a gas-tight enclosure is disposed about one or more of said fuel cell stacks of said assembly. The gas-tight enclosure operates as an outer exhaust manifold for collecting exhaust from the fuel cell stacks. According to one practice, a first fuel cell stack, which generates exhaust at a first operating temperature, is coupled to a second fuel cell stack to receive the exhaust. the second fuel cell stack heats the exhaust to a second operating temperature higher than the first operating temperature. The exhaust can be optionally introduced to the second fuel cell stack as the oxidizer reactant. Furthermore, the second fuel cell stack can be optionally coupled to a third fuel cell stack having a third operating temperature higher than said second operating temperature.

In still another aspect, a number of fuel cell stacks are serially coupled together to heat a fluid, such as the reactants, from a first temperature to a selected temperature. The number of fuel cell stacks are chosen as a function of the selected temperature.

According to another aspect, the power also includes a controller for controlling the amount of fuel supplied to said fuel cell stacks. The controller can include a valve or orifice, or other associated hardware.

According to yet another aspect, the assembly of fuel cell stacks is arranged to form upper fuel cell stacks and lower fuel cell stacks. The upper fuel cell stacks are composed of a material suitable for operation at a first operating temperature, and the lower fuel cell stacks are composed of a material suitable for operation at a second lower operating temperature. A gas-tight enclosure can be disposed about the assembly such that the lower fuel cell stacks are disposed closer to a support structure relative to the upper fuel cell stacks. The operating temperatures of the lower fuel cell stacks can be selected to be different than the operating temperature of the upper fuel cell stacks. Alternatively, the assembly of fuel cell stacks can be arranged to form inner fuel cell stacks and outer fuel cell stacks. The outer fuel cell stacks are composed of a material suitable for operation at a first operating temperature, and the inner fuel cell stacks are composed of a material suitable for operation at a second higher operating temperature.

In another aspect, one or more of the fuel cell stacks comprises multiple axially adjacent temperature regions along the stack, such that each region operates at a different operating temperature. A gas-tight enclosure is disposed about the fuel cell stack for collecting exhaust therefrom. In another aspect, a fluid blocking element is disposed in the fuel cell stack and positioned at a location to selectively occlude one of axially extending manifolds. The blocking element prevents passage of the corresponding reactant within the manifold.

According to another aspect, the fluid blocking element is disposed within said oxidizer manifold, and the fuel cell stack emits exhaust about at least a portion of the periphery of one temperature region, and reintroduces the exhaust to the adjacent temperature region at the periphery and into the oxidizer manifold. The fluid blocking element is disposed at the junction between said temperature regions.

According to still another aspect, the fuel cell stack has first and second adjacent temperature regions. The first temperature regions is formed of a material adapted to operate at a first operational temperature, and the second region is formed of a material adapted to operate at a second operational temperature different than the first operational temperature. The fluid blocking element is disposed at the junction of the first and second regions, and therefore defines the interface between the regions.

According to another aspect, the assembly includes two or more fuel cell stacks forming separate spatially separated fuel cells that operate at different operating temperatures. A gas-tight enclosure is disposed about at least one of the fuel cell stacks and is adapted to collect exhaust from the stack. Structure is provided for coupling the exhaust of one fuel cell stack to another spatially separated fuel cell stack. According to another practice, a first fuel cell stack adapted to generate exhaust at a first operating temperature is coupled to a second fuel cell stack. The second stack receives the exhaust and heats it to a second operating temperature higher than the first operating temperature.

The power system of the present invention can also include one or more compressors associated with one or more fuel cell stacks for compressing one of said reactants, and one or more turbines associated with the fuel cell stacks and adapted to receive exhaust produced thereby. The turbine converts the fuel cell stack exhaust into rotary energy. The system also provides a steam generator associated with the gas turbine and adapted to receive the gas turbine exhaust, the steam generator coupling the exhaust of the gas turbine to a working medium.

The present invention also provides for methods of producing electricity with a fuel cell power system.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

The present invention is directed towards an elegant solution for increasing the overall system efficiency of a fuel cell related power system. Specifically, the present invention is directed towards multiple methods of reducing the total amount of cooling fluid which must be passed through a fuel cell in order to properly remove heat therefrom. As is known is in art, the overall system performance of a fuel cell power system is predicated on the overall efficiency of the fuel cell, as well as that of any associated subsystems, such as cooling and other power components. Generally, the power system has to manage a certain amount of heat created during the electrochemical reactions of the fuel cell, regardless of the overall fuel cell operating temperature. The waste heat generated by the fuel cell can be removed by passing an oxidant, such as air, through the fuel cell. The sensible heat capacity of the air or cooling medium passing through the fuel cell helps remove waste heat. Hence, the inlet temperature of the air introduced to the fuel cell is important, since the initial input temperature determines the amount of heat the air can absorb while passing through the fuel cell. In conventional approaches, the air is preheated to an elevated temperature at or near the operating temperature of the fuel cell, thereby significantly reducing the heat absorbent capacity of the air. Consequently, a large amount must be forced through the fuel cell in order to carry away sufficient amounts of waste heat. The present invention reduces the amount of cooling fluid that must be passed through the fuel cell to remove the fuel cell generated waste heat.

Figure 1:
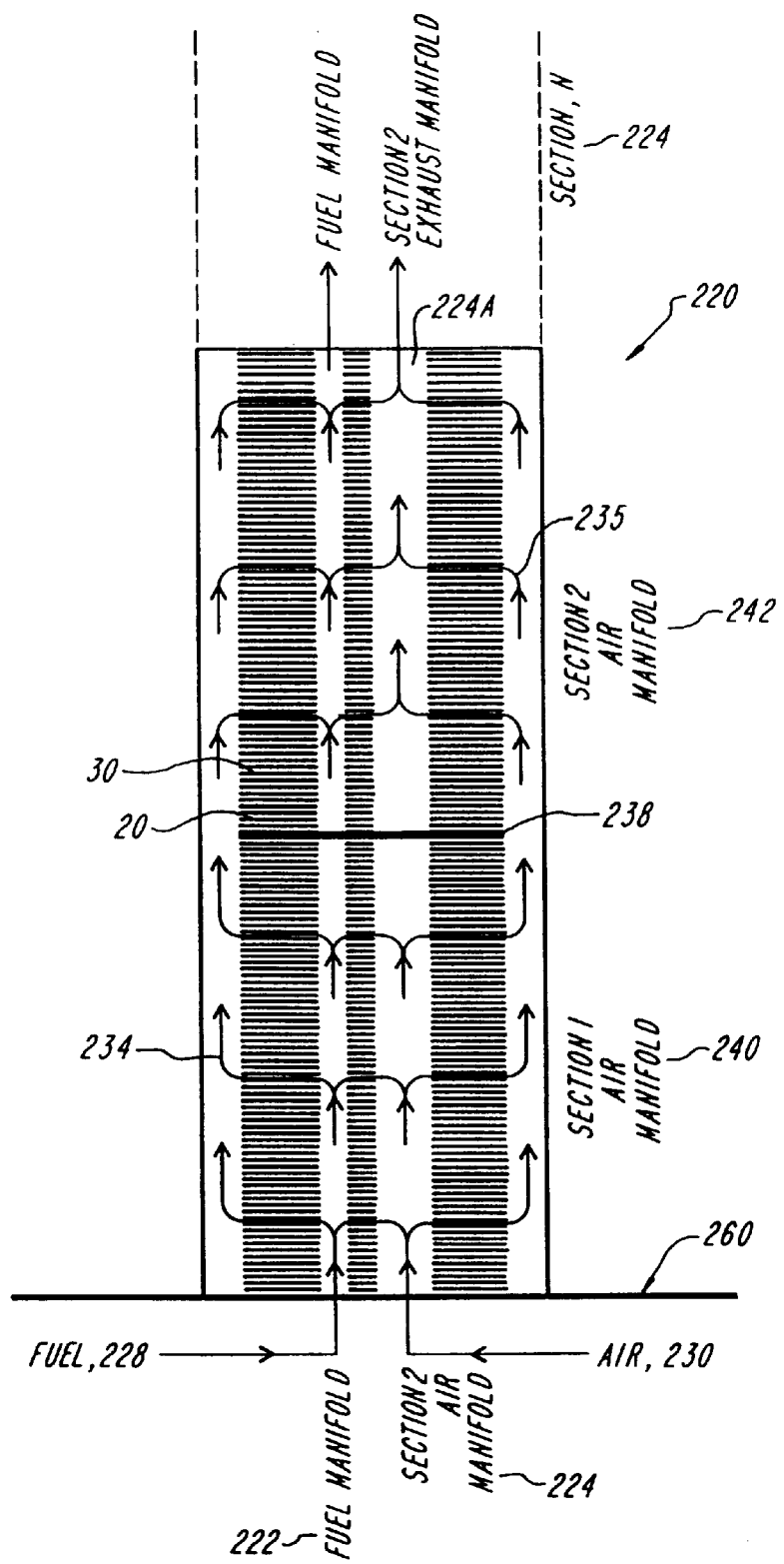
FIG. 1 is a schematic illustration of one embodiment of the fuel cell power system of the present invention that employs multiple temperature regions along the fuel cell stack.
Figure 2:
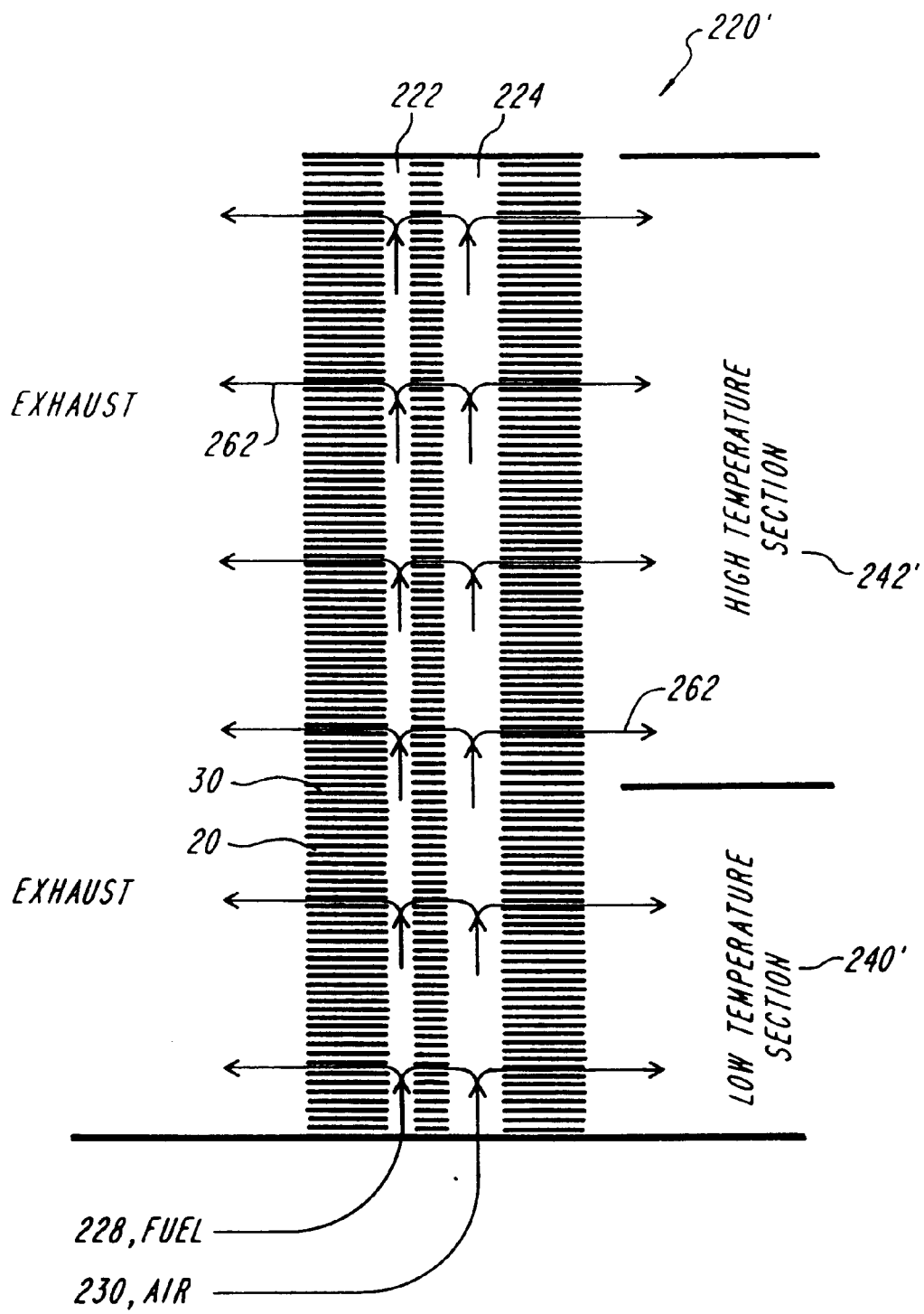
FIG. 2 is a schematic illustration of another embodiment of the fuel cell power system of the present invention that employs multiple temperature regions along the fuel cell stack.
Figure 6:
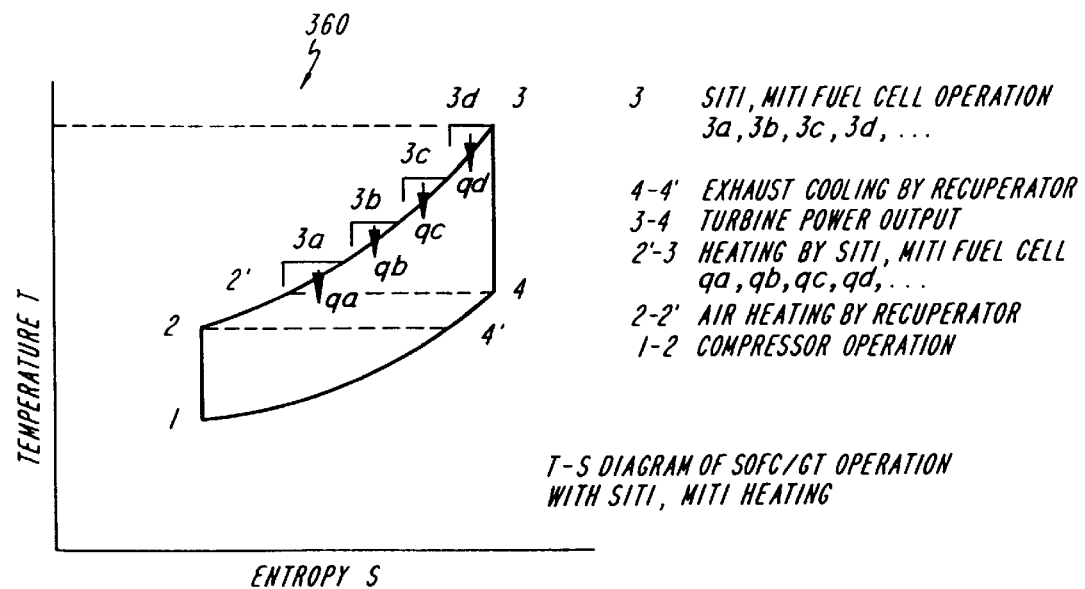
FIG. 6 graphically illustrates the temperature operation of a fuel cell and gas turbine power system employing multiple temperature ranges for the fuel cell operation in accordance with the teachings of the present invention.
Figure 7:
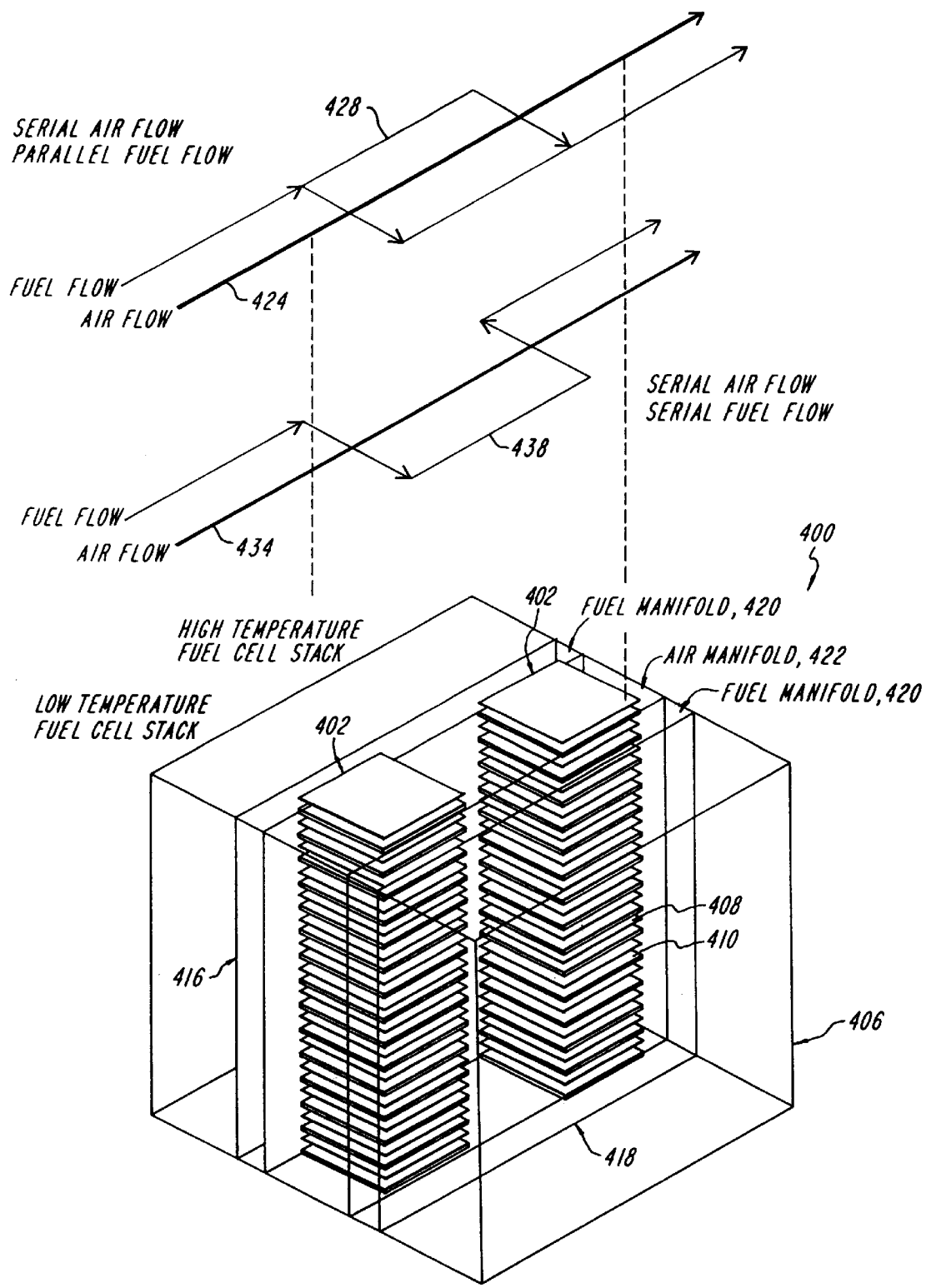
FIG. 7 is a schematic depiction of a fuel cell power system according to the present invention having a rectangular cross-sectional shape.
Figure 8:
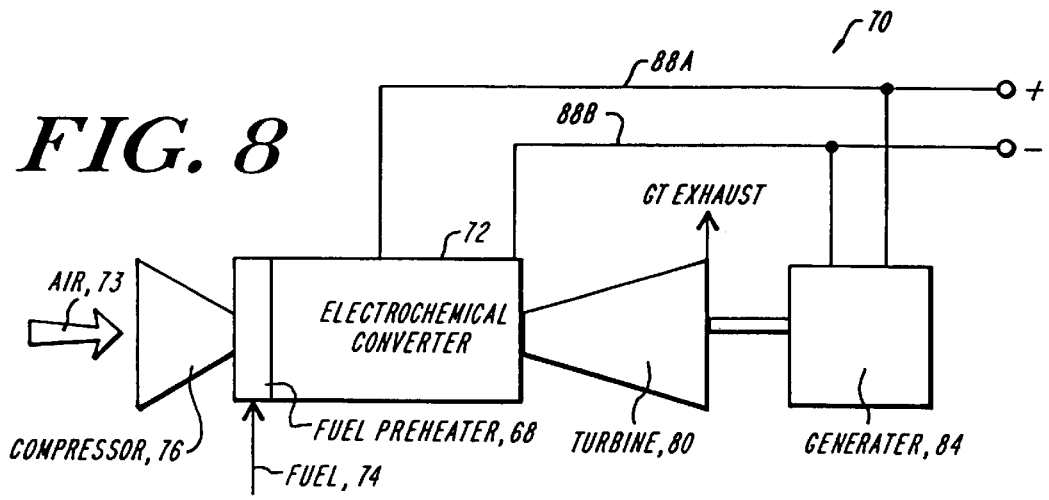
FIG. 8 is a schematic block diagram of a power system employing an electrochemical converter serially in-line with a gas turbine according to the present invention.

FIGS. 1 and 2 illustrate a first power device suitable for use in a power system for heating input reactants having a relatively low input temperature to a significantly higher exhaust temperature. FIG. 1 illustrates a power device that employs a fuel cell stack 220 according to the teachings of the present invention. The illustrated fuel cell stack 220 includes a plurality of alternately stacked electrolyte plates 20 and interconnector plates 30, as illustrated in FIGS. 6 through 8. Those of ordinary skill will recognize that the fuel cell stack can employ any conventional type fuel cell components, including planar and tubular, in addition to those described herein. The preferred fuel cell construction employs a thermally conductive extended lip attached to the interconnector plate of the basic fuel cell units described in detail below. Furthermore, the term "fuel cell stack" is intended to mean either a single complete operational fuel cell, or one or more axial sections of a complete fuel cell.

The illustrated fuel cell stack 220 has a plurality of axially extending manifolds 222 and 224 form therein. The illustrated fuel manifold 222 is preferably coupled by suitable fluid conduits to a fuel supply 228. Likewise, the illustrated air manifold 224 is coupled by suitable fluid conduits to an air or oxidant supply 230. Each electrolyte plate 20 is typically an ionic conductor having low ionic resistance to allow the transport of an ionic species from one electrolyte interface to an opposite electrolyte interface under the operating conditions of the fuel cell stack. The fuel cell stack 220 electrochemically consumes the input reactants and generates exhaust and waste heat. In the illustrated embodiment, the exhaust 234 is discharged from the fuel cell stack 220 at least a portion of the peripheral edges of the fuel cell stack, as well as through the manifold 224A. The fuel cell 220 can include any number and arrangement of manifolds consistent with the teachings of the present invention.

The fuel cell stack 220 further includes a fluid blocking element 238 that is positioned at a selective axial location along the fuel cell stack 220. The fluid blocking element 238 is interposed between the fuel cell plates 20 and 30, and operate to occlude or block selectively one or both of the axial manifolds 222 and 224. For example, the fluid blocking element 238 can be constructed so as to occlude the air manifold 224, thereby preventing the passage of the air 230 throughout the entire length of the air manifold 224. Those of ordinary skill will also recognize that the fluid blocking element 238 can also be constructed to occlude the fuel manifold with the addition of a fourth axial manifold to achieve a similar air flow pattern.

The fluid blocking element can be formed of any suitable material that is compatible with the operational conditions of the fuel cell stack and with the electrolyte plates 20 and interconnect plates 30. The fluid blocking element can be formed of the same material as any one of the fuel cell plates, and preferably the interconnector plate.

The illustrated fuel cell stack is optionally coupled to a support structure 260, such as a base plate or floor, to provide mechanical support to the fuel cell.

With reference again to FIG. 1, the fuel cell stack 220 is divided into separate, discrete and axially adjacent temperature regions or sections 1, 2 through N, and designated 240, 242 and 244, respectively. The placement of the fluid blocking element defines the temperature regions. The temperature regions or sections of the fuel cell stack 220 are preferably operated at different temperatures to form multiple temperature regions along the axial length of the fuel cell stack. The multiple temperature regions 240, 242 and 244 provide for a multiple temperature regime in a single fuel cell stack. This enables the fuel cell stack 220 to heat incoming reactants in a stepwise manner as the reactant passes along the fuel cell stack. For example, the input reactants 228 and 230 can be introduced to the fuel cell stack 220 at a temperature significantly below the temperature at which the exhaust is eventually released from the stack.

The fuel cell stack 220 is selectively constructed to form multiple adjacent temperature regions and to increase, maximize or optimize the efficiency of the power system. It is realized that the general dimensions, construction, and materials can be selected to form the fuel cell stack 220 of the present invention. Specifically, the fuel cell stack is sized and dimensioned to control the amount of energy created within the fuel cell and within each temperature region. The dimensions that can be appropriately adjusted are the length and diameter of the stack. In an illustrative example, the fuel cell stack can be formed so as to be about 1 foot long with a plate diameter of about 2 feet, or alternatively, can be formed about 5 feet long with a plate diameter of about 5 inches. Advantageously, the fuel cell stack 220 employs a lip structure coupled to one of the plates to heat the reactants and/or exhaust, as described in further detail below. The specific fuel cell components 20, 30 can be dimensioned and constructed to heat the incoming reactant to the appropriate level when resident in a selected temperature section, based on the input temperature of the reactant, the final temperature of the exhaust, and the number of axial temperature regions. Those of ordinary skill will be readily able to select the appropriate fuel cell dimensions based on the foregoing variables.

The performance of each temperature region of the fuel cell stack can be maximized by forming each section of a material suitable for use at the operational temperature of the region. Exemplary electrolyte materials suitable for use in such a wide temperature range include solid state or solid oxide materials including yttria stabilized zirconia, lanthanum gallate, ceria based oxide, bismuth based oxide, or composites of anyone of the foregoing materials; and exemplary fuel cell types include solid oxide or solid state fuel cells, molten carbonate fuel cells, phosphoric acid fuel cells, alkaline fuel cells, and proton exchange membrane fuel cells. The portion of the fuel cell defined by each temperature section operates at a selected temperature, and hence has an associated suitable electrolyte material. Those of ordinary skill will readily recognize which of the foregoing materials are best suited for a particular temperature range.

According to one practice, the air 230 is introduced to the air manifold 224 at a temperature of about 500° C., well below the exhaust temperature of 1000° C. of a conventional solid oxide fuel cell. The air 230 functions as the oxidant for the fuel cell stack, while concurrently operating as the cooling medium to help remove waste heat generated during operation of the fuel cell. The fuel and air interact with electrolyte plates 20 to allow the electrochemical reaction to occur along the length of the first temperature region 240. The interim exhaust 234 emitted by section 240 contains unreacted oxygen as well as spent fuel and nitrogen. The first temperature section 240 of the fuel cell stack heats the air 230 to an elevated temperature, for example, 600° C., higher than the input temperature. The fluid blocking element 238 is located at the junction of interface between the adjacent temperature regions 240 and 242 and impedes the air 230 flowing along the air manifold 224.

The interim exhaust 234 generated in temperature region 240 is then expelled along a peripheral portion of the fuel cell stack and captured by a gas-tight enclosure disposed about the fuel cell stack. The term "gas-tight enclosure" is intended to include the thermal enclosure or vessel 250, a pressure vessel 120, or any suitable fluid collecting apparatus. The fuel cell stack 220 is placed inside the thermal enclosure 250 and forms an annular passage in which the exhaust 234 travels, and then passes radially inwardly along the plates to reenter an upper portion of the air manifold 224A.

The exhaust 235 while passing along that portion of the fuel cell stack that corresponds to the second axially adjacent temperature section 242 is heated by the waste heat generated by the fuel cell to a selected temperature higher than that of the first section 240. The exhaust is further heated in the axially adjacent temperature region 242 to a higher temperature, for example, 700° C., in accordance with the teachings of the present invention. This process is repeated along the length of the stack such that the exhaust which exits from the last temperature region 244 is generally at the desired temperature, and when utilizing a solid oxide fuel cell, it is preferably at about 1000° C.

As described above, the reactants 228 and 230 are introduced to their respective axial manifolds 222 and 224 at a relatively low input temperature and exit from the fuel cell stack at a significantly higher temperature. The energy content associated with temperature rise of the reactants while passing through the fuel cell stack is utilized to achieve cooling of the fuel cell. In order to effect a constant power generation of the fuel cell, systems that accommodate larger temperature rises of the reactants while passing through the fuel cell utilize less amounts of the reactants for cooling. Typically, air is used as the primary coolant, and the low limit of air consumption for the normal and proper operation of the fuel cell is known as the stoichiometric rate. The illustrated fuel cell 220 is designed in size to operate effectively over wide ranges of temperatures. Specifically, the illustrated fuel cell accommodates low temperature oxidant which can rise in temperature as it passes through the entire stack in ranges well over 100° C., which is the typical upper level traditional and conventional fuel cells, and preferably up to 1000° C.

According to another practice, each temperature section 240, 242 and 244 is formed of different materials compatible with the specific operating temperature of each section. The first temperature section 240 can operate at a temperature of 600° C., and is formed of bismuth oxide. The partially spent air 230 leaving this section then passes through the axially adjacent section 240 and is heated by the fuel cell to a further elevated temperature. This region of the fuel cell operates at a temperature of 800° C. and can be formed of lanthanum gallate. A third section can be employed that operates at 1000° C. and is formed of yttria stabilized zirconia. These sections are cascaded together to achieve a selected stepwise increase in temperature at each stage as a function of the input temperature of the air 230 and the desired output temperature of the exhaust. This temperature differential between the input air and the exhaust defines both the stepwise increase in temperatures performed by each stage, as well as the number of sections or stacks necessary to be formed in the fuel cell stack 220. The number of stages can be selected to achieve a sufficient increase in temperature at each stage while concomitantly minimizing the amount of input air 230 necessary to pass through the fuel cell stack to remove the waste heat generated thereby. Hence, the desired temperature increase at each section, the number of sections, and the temperature of the input air can selected to minimize the amount of air necessary to pass through the fuel cell stack to provide a flexible system that can be adjusted to optimize system performance.

A significant advantage of forming multiple temperature regions in the fuel cell stack 220 is that the fuel cell power system employs a relatively small volume of air, typically five to ten times less then traditional fuel cells, to both serve as the oxidant for the electrochemical reaction performed by the fuel cell as well as providing sufficient heat removal capacity to maintain the temperatures of the fuel cell sections within suitable ranges. This is accomplished by heating the same volume of air in multiple, axially adjacent temperature regions to increase, in a stepwise fashion, the temperature of the air as it passes through the fuel cell stack. The stepwise increase in temperature allows the use of a low temperature input air, so as to maximize the sensible heat absorbent capacity of the coolant flow. Hence, a relatively small volume of air can be employed to extract a significant amount of waste heat from the fuel cell stack as it passes through the fuel cells. The fluid blocking element 234 assists the fuel cell to divert reactant, such as air 230, to be partially consumed by the fuel cell stack or section, and then reintroduced to the subsequent sections for further use by the downstream temperature regions.

Another significant advantage of the multiple temperature regions formed in the fuel cell stack 220 is that they increase the operational efficiency of the power system. This occurs since the fuel cell can remove significant quantities of heat with relatively low volumes of a cooling medium. The present inventors have realized that the overall efficiency of the power system is easily assessed by examining the overall inefficiency of the power system. One of the important physical quantities associated with power system inefficiency is the overall thermal or energy loss of the system through the gas effluence or exhaust. Typically, the exhaust contains nitrogen, unreacted oxygen and combustion resultants such as water vapor and carbon dioxide. The overall energy content present within the exhaust is a function of exhaust temperature and exhaust amount. Hence, the more air passing through the power system the greater the volume of exhaust, which corresponds to a decrease in overall system efficiency. Furthermore, the overall nitrogen content within the fuel cell exhaust can be reduced by reducing the total volume of air introduced to the power system.

Typically, the fuel cells employ water or oxidant to assist in the removal of the exothermic heat generated by the fuel cell during use. In the case of oxidant cooling, such as air, which is particularly applicable for high temperature fuel cells, such as solid oxide fuel cells, the amount of air passing through conventional fuel cell can be five to ten times higher then the stoichiometric oxidant amounts required for the fuel cell. The present invention reduces the total volume of air 230 required to pass through the fuel cell to absorb the necessary amounts of waste heat by employing either a thermally conductive lip on one of the plates 20 and 30 of the fuel cell, or by forming multiple temperature regions in the fuel cell stack 220.

Those of ordinary skill will also recognize that either or both of the fuel 228 and the air 230 can be introduced as described above and regulated when passing through the fuel cell stack. Specifically, an active electronic control system can be employed to meter or control the supply of fuel and/or air to the fuel cell stack. Other examples of control devices include passive devices such as a valve or appropriately sized fluid conduit or orifice.

FIG. 2 illustrates another embodiment of the fuel cell stack according to the teachings of the present invention. Like numbers will be used throughout the figure to represent like parts plus a superscript prime. The illustrated fuel cell stack 220' comprises multiple temperature regions, such as a low temperature section 240' and an axially adjacent high temperature section 242'. A fuel 228 and air 230 are introduced to, respectively, a fuel manifold 222 and an air manifold 224, axially formed in the fuel cell stack 220'. The fuel cell stack 220' is preferably composed of alternately stacked electrolyte plates 20 and interconnector plates 30.

The illustrated fuel cell stack 220' is free of a confining gas-tight enclosure and a fluid blocking element. The fuel 228 and air 230 introduced to the fuel cell manifolds travel through the entire axial manifolds generally free of obstruction. Hence, the air and fuel are heated during its travel through the fuel cell 220'. As is known, the fuel cell 220' consumes the input reactants to produce an output exhaust 262 that exits from a peripheral portion of the fuel cell stack. The low temperature section 240' heats the input oxidant reactant, such as air 230, from the input temperature to the elevated operational temperature of the fuel cell. The low temperature section 240' hence heats the air from the input temperature to a higher temperature by allowing the air 230 to absorb a selected amount of waste heat generated by the fuel cell stack 220' during operation.

The illustrated high temperature section 242' operates at a temperature higher than the low temperature section 240', and hence heats the input reactants from the lower input temperature to a higher temperature consistent with the operating temperature of this section. The high and low temperature sections 240' and 242' are formed with materials compatible with the preferred temperatures of the particular sections.

The particular temperatures of each axially adjacent section can be regulated by metering the amount of fuel 228 introduced to the fuel cell stack 220'. Although the illustrated embodiment shows a single fuel supply 228 and associated fuel conduits for introducing the fuel to the fuel cell stack 220', multiple fuel supply systems can be employed to introduce fuel to the fuel cell stack 220', or separately to each temperature region in the stack. Those of ordinary skill will readily recognize that passive or active control systems, such as valves, appropriately sized fuel conduits, or electronic feedback control systems can be employed to control the amount of fuel or air introduced to the fuel cell stack.

The illustrated fuel cell 220' is suitable for use in an array or assembly of fuel cell stacks that are disposed within a gas-tight enclosure or vessel, such as the vessel 120. In particular, the fuel cell stacks can be distributed in the vessel such that lower temperature fuel cells are disposed closer to the wall of the pressure vessel where the heat loss is more severe, and the higher temperature fuel cells are disposed further away from the wall and towards the center or inner portion of the fuel cell assembly, where the heat loss to the vessel is minimized.

Figure 3:
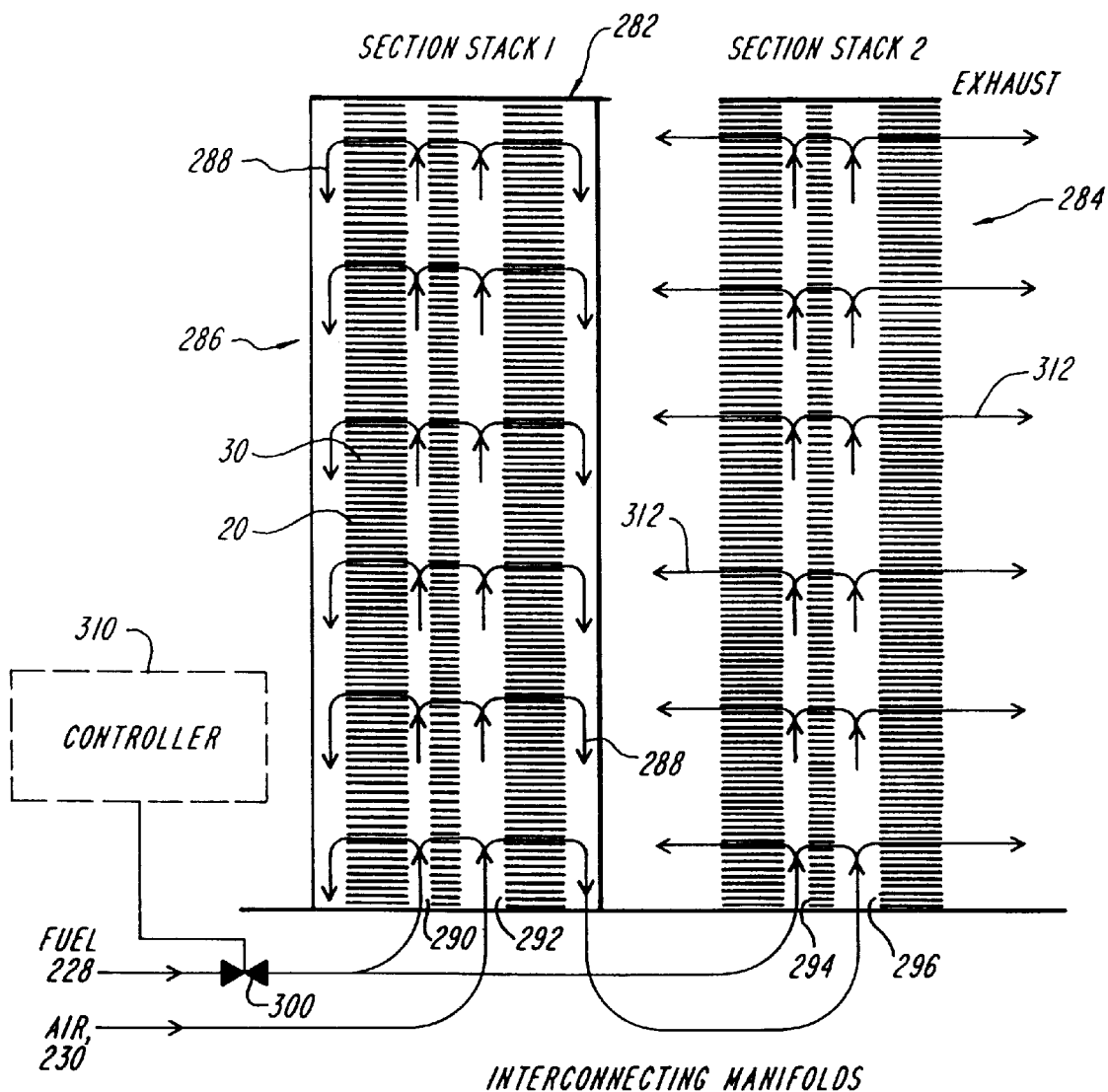
FIG. 3 is a schematic illustration of one embodiment of a fuel cell power system that employs multiple fuel cells that operate at different temperatures to heat a selected volume of reactant over a large temperature range to a desired operating temperature.
Figure 4:
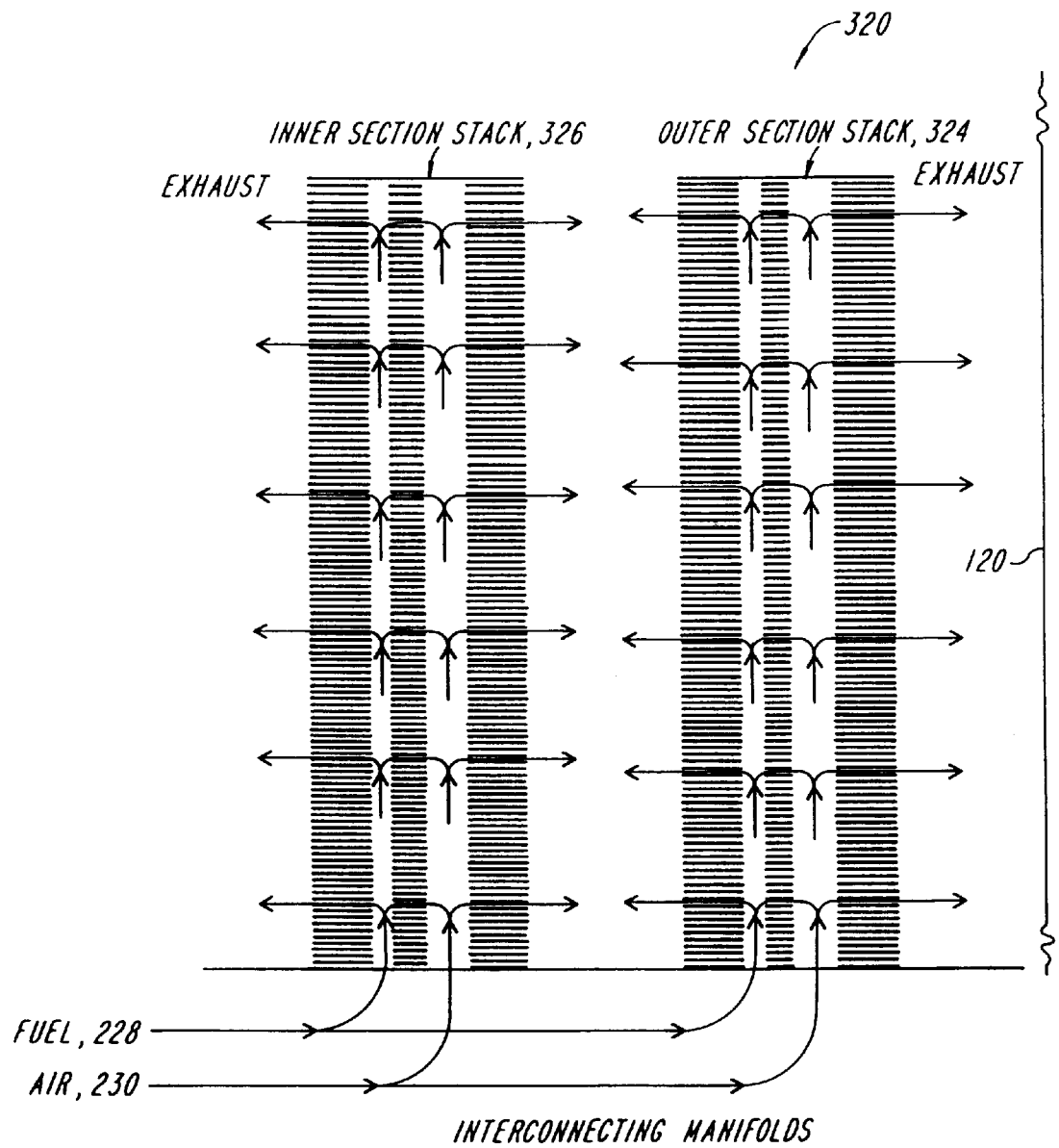
FIG. 4 is a schematic illustration of another embodiment of the fuel cell power system having multiple fuel cells that operate at different temperatures according to the teachings of the present invention.

FIGS. 3 and 4 illustrate another embodiment of the fuel cell power system according to the teachings of the present invention. FIG. 3 shows a power system 280 that employs an assembly of serially connected, spatially separated fuel cell stacks, such as fuel cell stacks 282 and 284, to heat a volume of air in different stages to a final desired temperature. Those of ordinary skill will recognize that any number of fuel cells can be employed in the power system, and two are shown merely as an illustrative example. Hence, the assembly can include one fuel cell or a plurality of fuel cells. The fuel cells can be radially or axially separated. Each illustrated fuel cell 282 and 284 are composed of a number of alternately stacked electrolyte plates 20 and interconnector plates 30, as previously described. The illustrated fuel cell stack 282 is disposed within a thermal enclosure 286 to help collect interim exhaust 288 generated by the fuel cell 282.

The fuel 228 is introduced to an axially extending fuel manifold 290 and is concomitantly introduced to an axially extending fuel manifold 294 formed in the fuel cell stack 284. A valve 300 can be employed to regulate the amount of fuel introduced to the fuel cell stacks 282 and 284, and, according to another practice, can be optionally connected to a controller 310 to provide automatic control of the fuel supplied to the fuel cells. The air supply 230 is introduced to an axially extending air manifold 292 formed in the fuel cell 282. The interim exhaust 288 generated by the fuel cell 282 is collected by the thermal enclosure 286 and is introduced, via appropriate fluid conduits, to the air manifold 296 of fuel cell 284. Hence, the spent reactants generated by the fuel cell 282 are introduced to the air manifold 296 of fuel cell stack 284, while a fresh supply of fuel 228 is introduced to the fuel manifold 294. The illustrated fuel cell 284 consumes the fuel and air to generate electricity, waste heat, and exhaust 312.

The illustrated fuel cell 282, according to one practice of the invention, can be operated at a first operating temperature which is lower than the operating temperature of the second, serially connected fuel cell 284. In this arrangement, the input air 230 is introduced to the fuel cell stack 282 at a first temperature, and is heated by the waste heat generated by the fuel cell to a second temperature higher than the input temperature. This heated exhaust 288 is then introduced to the higher temperature fuel cell stack 284 and is further heated thereby to yet a higher temperature, which results in exhaust 312 at a temperature higher than exhaust 288 generated by the fuel cell stack 282.

The illustrated power system 280 provides another method of heating an input reactant, such as air 230, in selected stages to a higher operating temperature. This heating scheme also serves to reduces the volume of air 230 required to pass through a fuel cell, thereby increasing the overall system efficiency.

The fuel cells 282 and 284 can be formed of selected material appropriate for the operational temperatures at which the fuel cell is to operate. Alternatively, the system 280 can be employed to couple together different types of fuel cells to heat an input reactant to a desired temperature. The fuel cells suitable for use in the illustrated power system 280 include solid oxide or solid state fuel cells, molten carbonate fuel cells, phosphoric acid fuel cells, alkaline fuel cells, and proton exchange membrane fuel cells. The solid state fuel cell further consists of selected materials, including yttria stabilized zirconia, lanthanum gallate, ceria based oxide, bismuth based oxide, or composites of anyone of the foregoing materials.

Referring again to FIG. 3, the exhaust generated by the fuel cells 282 and 284 are heated by the exothermic reactions of each fuel cell, and can be collected for additional use, such as for subsequent use by a cogeneration power system, or by a gas or steam turbine. The fuel 228 can be introduced into each fuel cell separately by a dedicated fuel supply system, or a single fuel supply system can be employed to supply fuel to all the fuel cells in series when another axial manifold is provided for the return fuel flow. Those of ordinary skill will readily recognize that any number of fuel cell stacks can be employed in the illustrated power system 280, and the number can be easily selected based on the type of fuel cell, the type of power system, the temperature of the input reactant, the thermal criteria of the power system, and the ultimate desired temperature of the fuel cell exhaust. Those of ordinary skill will also recognize that the fuel cell stacks illustrated in FIGS. 1 and 2 can be employed in this multiple, serially connected fuel cell power system 280 to heat reactants from a first input temperature to a desired temperature.

FIG. 4 illustrates a power system 320 suitable for use with a gas-tight enclosure, such as the vessel 120, according to the teachings of the present invention. The illustrated power system 320 employs an assembly of fuel cells that are selectively arranged to form an outer assembly of fuel cell stacks 324, disposed closer to the wall of the vessel 120, and an inner assembly of fuel cell stacks 326. The outer and inner fuel cell stacks are formed in accordance with the teachings of the present invention. The fuel 220 and the air 230 are introduced to the fuel cell stacks in a parallel supply arrangement. Specifically, the air and fuel are introduced to each fuel cell stack, and pass axially through the parallel manifolds. In the illustrated arrangement, the fuel cell stacks disposed in the outer assembly 324 generally operate at a temperature lower than the fuel cell stacks disposed at an inner portion of the assembly. This phenomena results from the outer stacks being located closer to adjacent structural components, such as the vessel 120, which operate as a heat sink. The inner fuel cell stacks 326 generally operate at higher temperatures since they are further isolated from any heat sink structure.

The illustrated system 320 therefor employs fuel cells that are composed of selected materials that conform with the actual temperature distributions of the fuel cell stacks in operation. For example, the fuel cell stacks disposed at the outer portion of the assembly, e.g., the outer stack section 324, can be formed of materials that are suitable for lower temperature operation. Conversely, the fuel cell stacks disposed at the inner portion of the assembly, e.g., the inner stack section 326, are formed of material that are compatible with higher temperature operation relative to the fuel cell stacks of the outer assembly. This material includes yttria stabilized zirconia, lanthanum gallate, ceria based oxide, bismuth based oxide, molten carbonate, or composites of anyone of the foregoing materials. Those of ordinary skill will recognize that the fuel cell stacks can be arranged to have inner and outer fuel cells, as well as upper and lower fuel cells if the assembly is arranged in a three-dimensional array.

The particular temperatures of each axially adjacent section can be regulated by metering the amount of fuel 228 introduced to the fuel cell stack 220. Although the illustrated embodiment shows a single fuel supply 228 and associated fuel conduits for introducing the fuel to the fuel cell stack 220, multiple fuel supply systems can be employed to introduce fuel to the fuel cell stack 220, or separately to each temperature region in the stack. Those of ordinary skill will readily recognize that passive or active control systems, such as valves, appropriately sized fuel conduits, or electronic feedback control systems can be employed to control the amount of fuel or air introduced to the fuel cell stack.

During operation, the fuel cell stacks develop temperature gradients that may exist in three dimensions. Hence, to address the vertical temperature gradients, fuel cell stacks having multiple discrete temperature zones, such as those disclosed in FIGS. 1 and 2, can be utilized. For temperature gradients along the horizontal spread of the fuel cell stack assembly, the fuel cell stacks can be chosen so as to form the fuel cell stacks at the lower temperature regions of material suitable for such use, and form the fuel cells and the higher temperature operating regions of material suitable for higher temperature use.

A significant advantage of employing either or both fuel cell stack designs is that they can be employed in a fuel cell power system according to the present invention to significantly reduce the requirements for excessive thermal insulation or thermocompensating apparatus for developing total uniformity throughout the fuel cell assembly. This reduces the energy lost through the thermal insulation of the vessel 120, resulting in an improved thermal efficiency of the overall power system.

The illustrated fuel cell power systems 220, 220', 280, and 320 can be employed in a power generation system that can operate with low temperature input reactants, and which are capable of use in a broad temperature range of between about 20° C. and about 2000° C. Consequently, the input reactants can be heated to a desired selected temperature at the exit of each fuel cell stack. The exhaust, or waste heat, of the fuel cell can then be employed in a downstream fuel cell for further utilization. Once a desired temperature is reached, the heated fuel cell exhaust can be used in a bottoming plant, such as a gas turbine, or an absorption chiller for an HVAC system.

Figure 5:
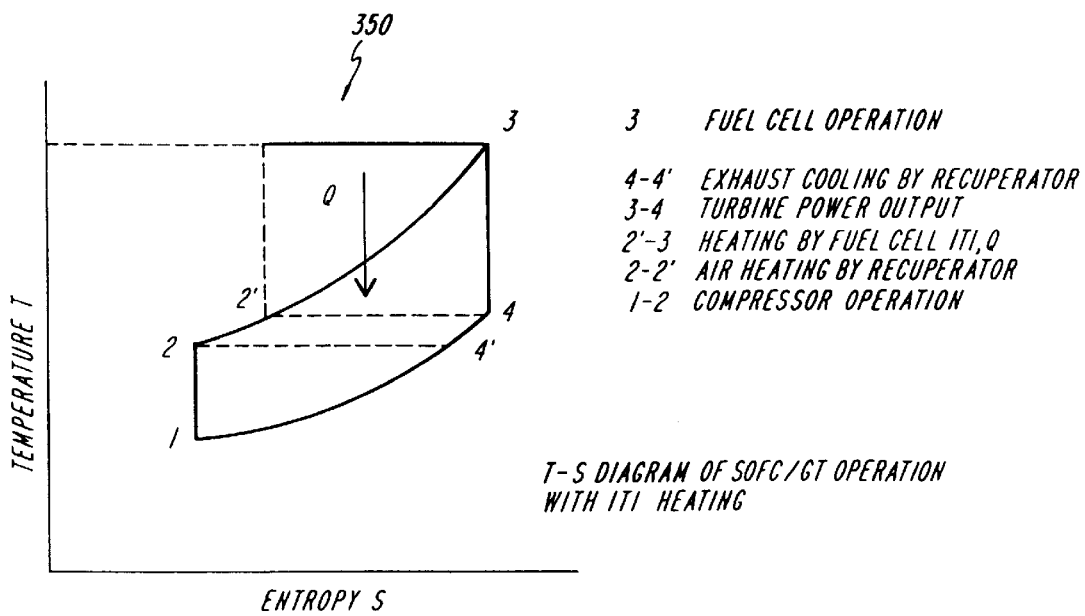
FIG. 5 graphically illustrates the temperature operation of a fuel cell and gas turbine power system.

Another advantage of the power systems of the present invention is that the fuel cell stacks can be employed to reduce the temperature increments and associated thermal mechanical stress that the fuel cells undergo during operation. The use of the interconnector plates with the extended lips, as described in detail below, further promotes isothermal conditions along the in-plane or radial surface of the plates, as well as along selected portions of the fuel cell stack, for optimum operational conditions over a wide temperature range. FIG. 5 is a graphical thermodynamic representation of a power system that employs a fuel cell and gas turbine according to the teachings of the present invention. The illustrated graph 350 denotes entropy S along the abscissa and denotes temperature along the ordinate. The typical gas turbine cycle denoted by 1, 2, 3 and 4. Specifically, a gas turbine that includes a recuperator operates in a cycle represented by 1-2-2'-3-4-4', where 4-4' provides heat to the process 2-2'. The fuel cell, in addition to producing electricity, generates waste heat, denoted by the cycle portion 2-3, without recuperation, or be the cycle portion 2'-3 with recuperation. The fuel cell in accordance with the teachings of the present invention maintains an isothermal temperature condition to obtain optical electrochemical performance.

According to another embodiment, fuel cells having different operating temperatures are aligned in a sequence of increasing temperate. The operating temperature of the fuel cell is between about 20° C. and about 1500° C., and the preferred fuel cell types include proton membrane fuel cells, phosphoric acid fuel cells, alkaline fuel cells, molten carbonate fuel cells, and solid oxide fuel cells, or solid state fuel cells, which can be composed of yttria stabilized zirconia, lanthanum gallate, ceria based oxide, bismuth based oxide, or composites of anyone of the foregoing materials, all arranged in an ascending temperature order. FIG. 6 illustrates the use of an assembly of fuel cells, A, B, C, D of different operational temperatures. The illustrated graph 360 also denotes entropy S along the abscissa and temperature T along the ordinate. The power system cycle follows the process states of 1, 2, 2', 3, 4 and 4'. Specifically, during compressor operation, the temperature increases from 1 to 2 while maintaining a near constant entropy. If the gas turbine includes a recuperator, the air is heated during cycle portion 2-2' and is further heated by a selected assembly of fuel cells between cycle portion 2'-3. The power system of the present invention can employ a series of fuel cells in accordance with the teachings of the present invention to provide a stepwise increase in temperature as dented by cycle portions 3A, 3B, 3C and 3D. The illustrated system cycle further illustrates cycle portions 3-4 associated with the power output of the turbine. The recuperator cools the exhaust of the turbine, as denoted by system cycle 4-4'.

FIG. 7 shows another embodiment of the fuel cell power system according to the teachings of the present invention. The illustrated power system 400 includes a series of rectangular-shaped fuel cell stacks 402 mounted within a gas-tight housing 406. The fuel cell stacks include a plurality of rectangular shaped electrolyte plates 408 and interconnector plates 410 that are alternately stacked together to form the fuel cell stacks 402. The interconnector plates and electrolyte plates are formed of the same materials as the embodiments illustrated throughout the drawings.

The power system 400 further mounts within the gas-tight vessel a pair of manifold covers 416 and 418 disposed on opposite sides of the fuel cell stacks. The manifold covers form fuel manifolds 420 that direct a fuel axially along the length of the fuel cell stacks. The disposition of the fuel manifolds 420 and the fuel cell stacks forms an air manifold 422 therebetween.

The power system 400 can operate in one of two modes. In the first operational mode, the oxidant reactant, such as air, is introduced transverse to the fuel cell stacks, as denoted by the air flow arrow 424, and passes along the oxidant side of the electrolyte plate, in-plane across the plate surface. The fuel reactant is also introduced transverse to the fuel cell stacks through the fuel manifold along a side adjacent the fuel cell stack that receives the air reactant. The fuel is then supplied to both fuel cell stacks substantially simultaneously, as denoted by the fuel cell arrow 428. The fuel reactant is thus introduced to both stacks separately, and the spent reactant is then removed from the stacks.

In the second operational mode, the oxidant reactant, such as air, is again introduced transverse to the fuel cell stacks, as denoted by the air flow arrow 434, and passes along the oxidant side of the electrolyte plate. The fuel reactant is introduced transverse to the fuel cell stacks through the fuel manifold along an adjacent side of the fuel cell stack. The fuel is supplied first to one fuel cell stack, passes along the other fuel manifold, and is then introduced to the second fuel cell stack in an opposite direction, as denoted by the fuel cell arrow 438. The fuel and air reactants are thus introduced serially to both fuel cell stacks The power system in accordance with the present invention can also employ tubular-shaped fuel cell stacks, in addition to the cylindrical and rectangular shaped fuel cell stacks described herein.

FIG. 8 a gas turbine power system according to the present invention. The illustrated in-line, aero-derivative gas turbine power system 70 includes an electrochemical converter 72 and a gas turbine assembly. The gas turbine comprises a compressor 76, a turbine 80, and a generator 84. Air from air source 73 is introduced to the compressor 76 by way of any suitable conduit where it is compressed, and thus heated, and then discharged and introduced to the electrochemical converter 72. The fuel 74 is introduced to a preheater 68 where it is preheated to a selected elevated temperature below the converter operating temperature. The heated air and fuel function as input reactants and power the electrochemical converter 72.

The converter 72 heats the compressed air introduced by the compressor 76 and the fuel 74 to produce high temperature exhaust. The exhaust is introduced to the gas turbine 80, which converts this thermal energy into rotary energy, for subsequent transfer to an electric generator 84. Specifically, the turbine converts the high temperature exhaust into rotary motion (via a turbine shaft), which performs work for electric power generation. The generator 84 produces electricity that can be used for both commercial and residential purposes. One benefit of utilizing the electrochemical converter as the gas turbine combustor is that the converter functions as an additional electric generator. The illustrated electrical connections 88A and 88B show that electricity can be extracted from both the generator 84 and the converter 72. The gas turbine components and generator are art known and commercially available. Those of ordinary skill will readily understand the operation of the gas turbine components, as well as the integration of the electrochemical converter and the gas turbine, especially in light of the present description and illustrations. For example, the ordinarily skilled artisan will readily recognize that the converter 72 can either fully or partially replace the combustor of the gas turbine of the present invention.

Figure 9:
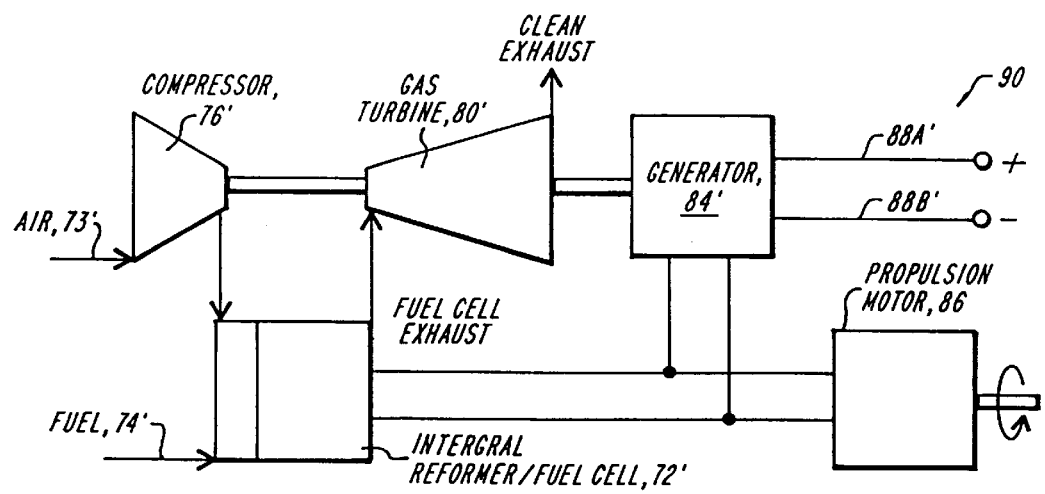
FIG. 9 is a schematic block diagram of an alternate embodiment of a power system employing an electrochemical converter out of line with a gas turbine according to the present invention.

FIG. 9 illustrates a power system 90 where the electrochemical converter 72' is coupled off-line from the gas turbine. Air from the air source 73' is compressed by the compressor 76', discharged, and then introduced to the off-line converter 72'. Fuel from a fuel source 74' is introduced to the converter and the air and fuel are consumed thereby. The converter, thermally disassociates the fuel into constituent non-complex reaction species, typically $H_2$ and CO, and creates high temperature exhaust. The exhaust is introduced to the gas turbine 80' which is coupled to the electric generator 84'. The illustrated generator 84' and converter 72' can be used to power the illustrated propulsion motor 86. The system 90 can further employ a preheater, similar to the preheater of FIG. 8, to preheat the reactants prior to introduction to the converter 72.

Figure 10:
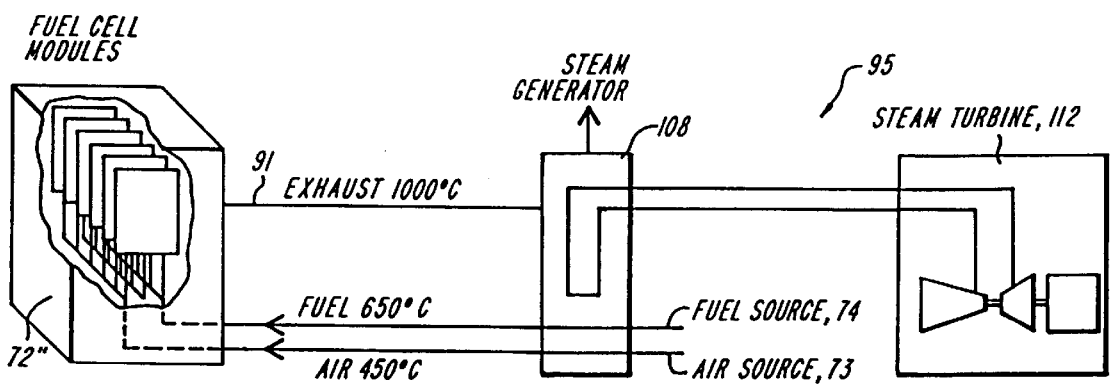
FIG. 10 is a schematic block diagram of a power system employing an electrochemical converter and a steam turbine according to the present invention.

FIG. 10 illustrates a power system 95 that employs an electrochemical converter 72", a heat recovery steam generator 108 (HRSG), and a steam turbine 112, connected as shown. The steam generator 108 functions as a preheater by preheating the input reactants, e.g., air and fuel, to a desirable elevated temperature below the operating temperature of the converter 72'. The converter utilizes the input reactants and creates waste heat and heated exhaust 91. The exhaust 91 can be conveyed to the steam generator 108 by any suitable means, such as by a fluid conduit. The heated exhaust helps preheat the reactants 73,74 by a regenerative heat exchange process, while concomitantly heating the working medium typically associated with the steam turbine, such as water, to produce steam for the steam turbine 112. In an alternate embodiment, the steam generator 108 includes internally a reformer for reforming fuel by thermal disassociation, which typically involves the reformation of hydrocarbons and reforming agents into non-complex reaction species.

Figure 11:
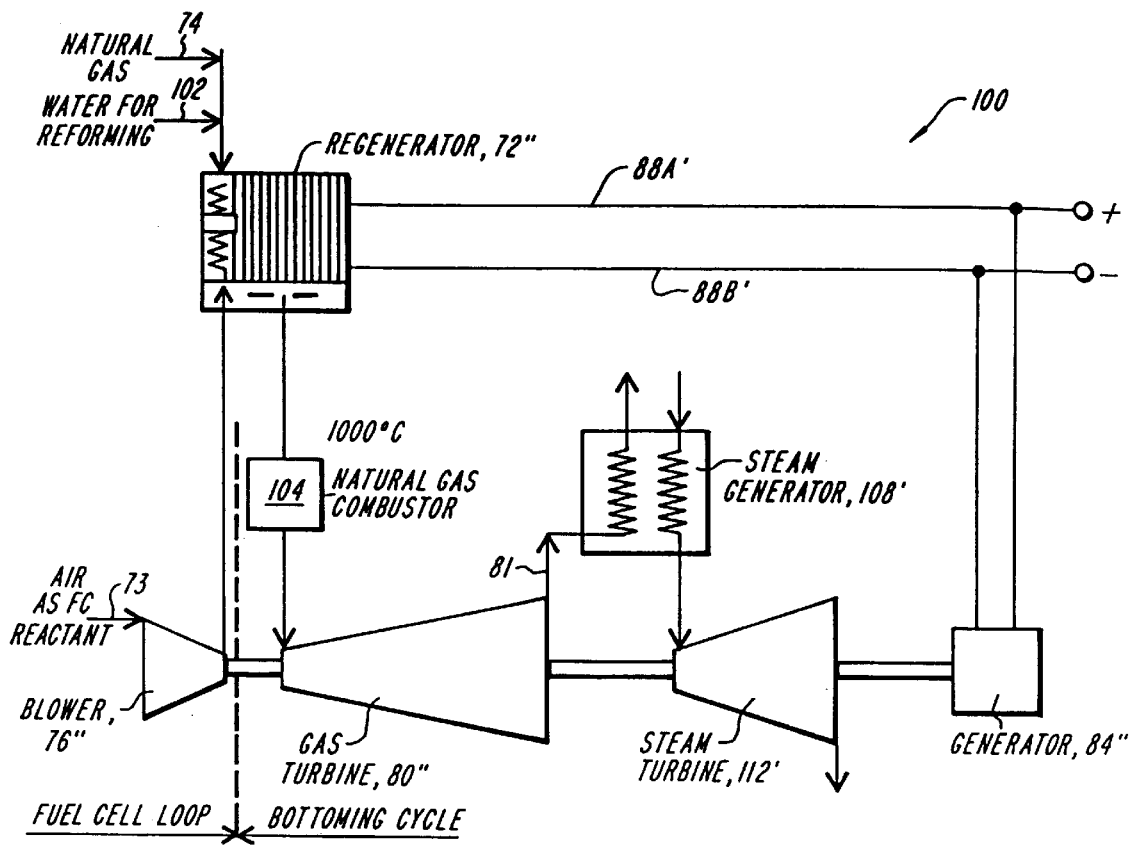
FIG. 11 is a schematic block diagram of another embodiment of a power system employing both a gas turbine, a steam turbine, and a converter exhaust heating element according to the present invention.

FIG. 11 shows an alternate power system 100 that utilizes an electrochemical converter, a gas turbine, and a steam turbine. The illustrated power system 100 includes a secondary combustor 104, a steam generator 108', and a steam turbine 112'. Fuel from a fuel source 74 and water 102 for reforming, generally supplied by a fluid reservoir (not shown), are introduced to the electrochemical converter 72". The water 102 and the waste heat produced by the converter 72" help reform the input fuel, e.g., fossil fuel, into usable non-complex reaction species, e.g., such as molecular hydrogen and carbon monoxide. Air from the air source 73 is preferably introduced to the converter 72" by way of the compressor or blower 76" and combines with the input fuel to power the converter 72". The converter 72" produces a high temperature exhaust, typically around 1000° C., which is further heated to a selected elevated temperature, e.g., 1300° C., by the secondary combustor 104 to match the predetermined inlet temperature requirements of the gas turbine 80". The gas turbine produces an exhaust output 81 which is passed through a heat recovery steam generator 108 for subsequent use with the bottoming steam turbine 112. The steam turbine output is coupled to the electric generator 84" which produces electricity. Electrical connections 88A' and 88B' indicate that electricity can be directly extracted from both the electrochemical converter 72" and the generator 84".

The illustrated power systems of FIGS. 8 through 11 provide the advantage in that they allow electricity to be produced in an high efficiency system by the direct integration of a highly efficient, compact electrochemical converter with the bottoming plant constituent components. The integration of the electrochemical converter with a gas turbine in the manner illustrated in FIGS. 8 through 11 produces a gas turbine power system that has an overall power efficiency of about 70%. This system efficiency represents a significant increase over the efficiencies achieved by prior art gas turbine systems and prior art electrochemical systems alone. The illustrated gas turbine power systems incorporate an electrochemical converter to provide high grade thermal energy and electricity, while utilizing the benefits of electrochemical converters. For example, the converter operates as a low NOx thermal source, thereby improving environmental performance relative to conventional gas turbine generating plants.

Figure 17:
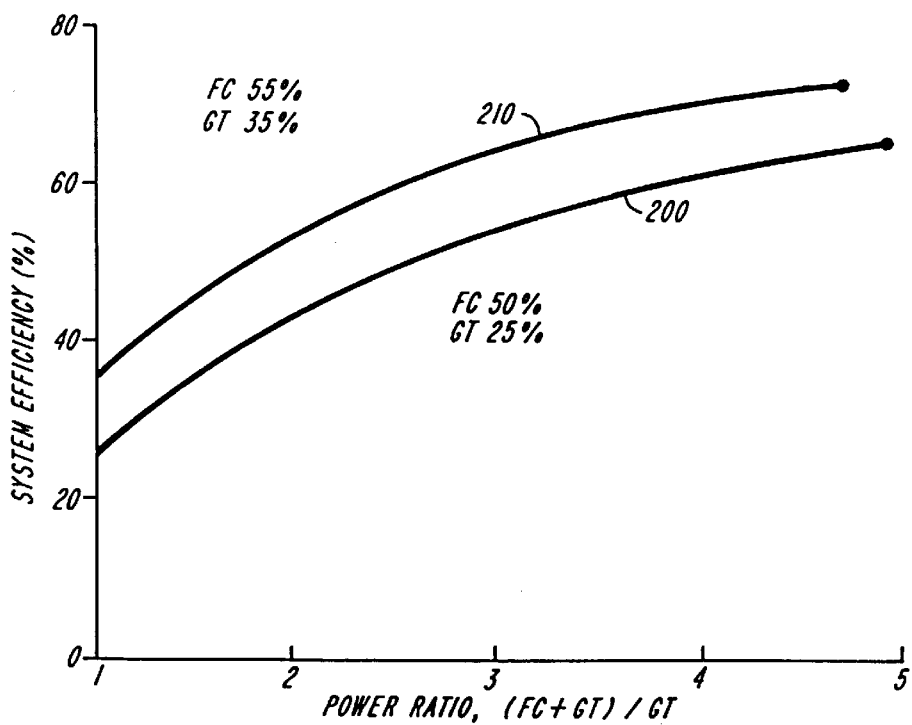
FIG. 17 graphically illustrates the combined power system efficiency of the power system of the present invention.

The high system efficiency of the combined electrochemical converter and gas turbine system is graphically illustrated in FIG. 17. The ordinate axis of the graph denotes the overall system efficiency in percent and the abscissa denotes the power ratio of the hybrid system. The power ratio is defined as the quotient of the sum of the sizes of the electrochemical converter and the gas turbine (FC+GT) divided by the size of the gas turbine (GT). Graph line 200 illustrates that the overall system efficiency can exceed 60% when utilizing a fuel cell having an efficiency of 50% and a gas turbine having an efficiency of 25%. Likewise, graph line 210 illustrates that the overall system efficiency can exceed 60% when utilizing a fuel cell having an efficiency of 55% and a gas turbine having an efficiency of 35%, and depending upon the power ratio, can approach 70%. The graph lines 200 and 210 also illustrate that the sizes and efficiencies of the electrochemical converter and gas turbine can be selected to maximize the overall system efficiency. Additionally, the graphs illustrate that a correspondingly large increase in system efficiency occurs when a gas turbine is combined with an electrochemical converter; a result that was heretofore unknown. For example, as previously stated, the gas turbine power system employing an electrochemical converter has an overall system efficiency exceeding 60% and approaching 70%, depending upon the sizes and efficiencies of the constituent gas turbine and the electrochemical converter.

Figure 16:
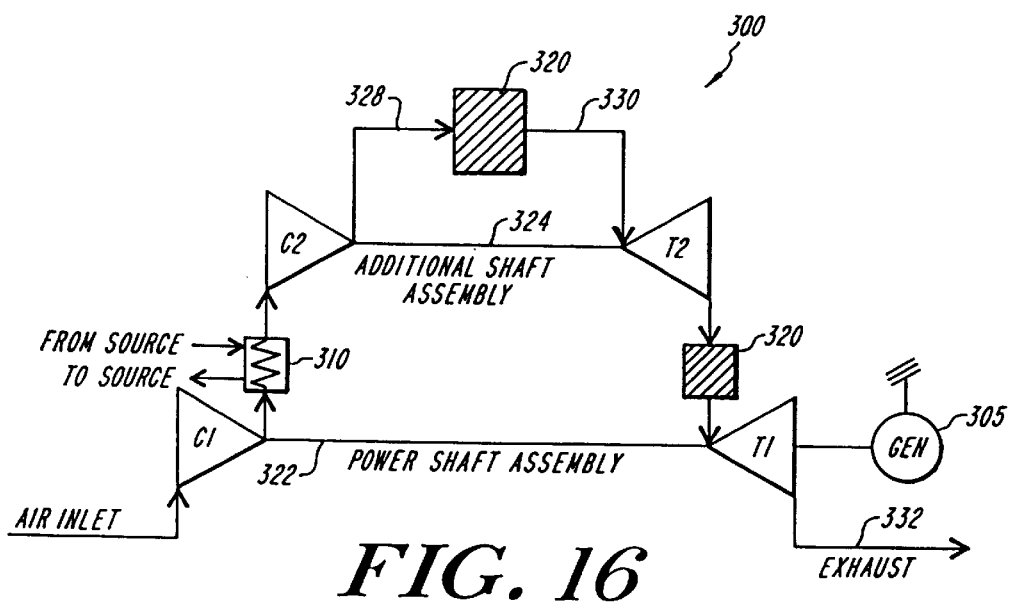
FIG. 16 is a schematic view of a multi-shaft gas turbine power system employing an electrochemical converter according to the present invention.

FIG. 16 a schematic representation of a power system 300 that integrates an electrochemical converter with a multiple-shaft gas turbine system. The illustrated gas turbine system can be a conventional combustion turbine system. The illustrated hybrid system 300 includes a pair of compressors C1 and C2, a pair of turbines T1 and T2, a generator 305, an intercooler 310, and one or more electrochemical converters 320. A pair of shafts 322,324 connect turbine T1 and T2 to mechanical compressors C1 and C2, respectively.

As shown, air from an air inlet enters the compressor C1 at its inlet and is compressed thereby. The compressed air then exits the compressor at its outlet and enters intercooler 310, which reduces the temperature of the compressed air prior to the air exiting the intercooler. The intercooler 310 receives a cooling fluid, such as water, at its inlet from a fluid source (not shown) and discharges the water at its outlet.

The cooled, compressed air then enters compressor C2, which again compresses the air prior to introduction to the first electrochemical converter 320. The air is transferred between the converter 320 and compressor C2 along fluid pathway 328. The air, upon introduction to the converter, reacts with fuel from a fuel source (not shown) and are consumed by the electrochemical converter 320 to generate electricity.

The converter exhaust is introduced to the turbine T2 along fluid pathway 330, the exhaust of which is introduced to a secondary converter 320. The secondary converter generates electricity and reheats the exhaust prior to introduction to turbine T1. The exhaust of the turbine T1 is preferably carried away from the system 300 along fluid pathway 332 for subsequent use. The rotary energy of the turbine T1 is preferably divided between the mechanical compressor C1 via the power shaft assembly 322 and the electric generator 305. The generator 305 can be used to generate electricity for a variety of residential and commercial purposes. Although the illustrated system 300 employs a pair of electrochemical converters 320, those of ordinary skill will recognize that only one converter may be used, with the other converter being replaced by a conventional combustor.

Other variations of the above designs exist and are deemed to be within the purview of one of ordinary skill. For example, a series of gas turbine assemblies may be employed, or any number of compressors, combustors and turbines may be used. The present invention is further intended to encompass the integration of an electrochemical converter with most types of gas turbines, including, single-shaft gas turbines, double-shaft gas turbines, regenerative gas turbines, intercooled gas turbines, and reheat gas turbines. In its broadest aspect, the present invention encompasses a hybrid power system that combines an electrochemical converter and a conventional gas turbine. According to one preferred practice of the invention, the converter replaces, either fully or partially, one or more combustors of the gas turbine power system.

Figure 12:
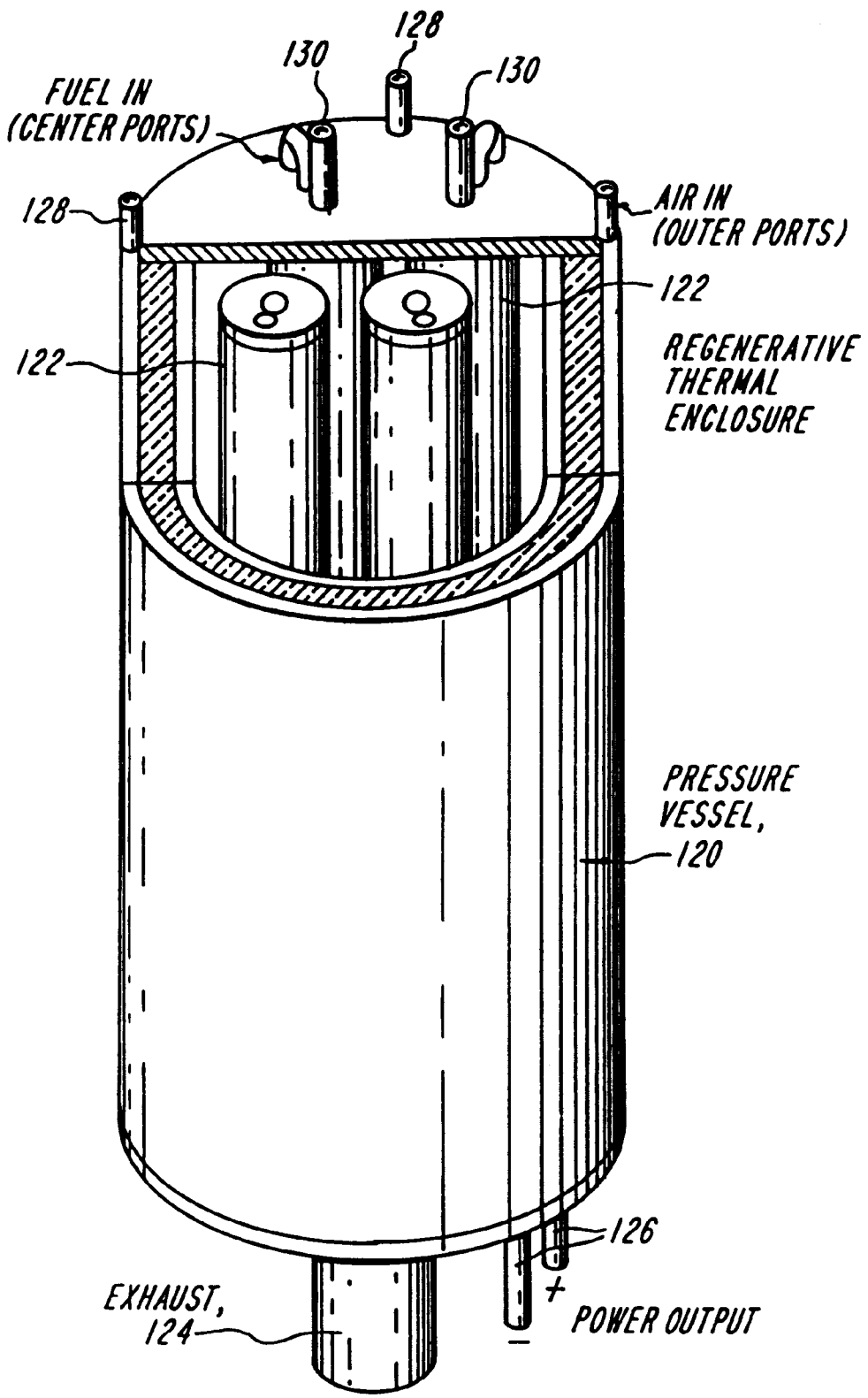
FIG. 12 is a plan view, partially cut-away, of a pressure vessel enclosing a series of electrochemical converters of the present invention.

The direct integration of an electrochemical converter with a gas turbine is aided when the electrochemical converter 72 is housed within a high pressure vessel 120. A preferred type of converter encasement is illustrated in FIG. 12, where a pressure vessel 120, which also functions as a regenerative thermal enclosure, encases a series of stacked fuel cell assemblies 122, which are described in greater detail below. The pressure vessel 120 includes an exhaust outlet manifold 124, electrical connectors 126 and input reactant manifolds 128 and 130. In a preferred embodiment, the oxidizer reactant is introduced to the resident fuel cell assemblies through the centrally located manifolds 130, and the fuel reactant is introduced through the fuel manifolds 128 located about the periphery of the vessel 120.

As described above, the electrochemical converter can be operated at an elevated temperature and at either ambient pressure or at an elevated pressure. The electrochemical converter is preferably a fuel cell system that can include an interdigitated heat exchanger, similar to the type shown and described in U.S. Pat. No. 4,853,100, which is herein incorporated by reference.

Fuel cells typically disassociate fuel by utilizing the chemical potential of selected fuel species, such as hydrogen or carbon monoxide molecules, to produce oxidized molecules in addition to electrical power. Since the cost of supplying molecular hydrogen or carbon monoxide is relatively higher than providing traditional fossil fuels, a fuel processing or reforming step can be utilized to convert the fossil fuels, such as coal and natural gas, to a reactant gas mixture high in hydrogen and carbon monoxide. Consequently, a fuel processor, either dedicated or disposed internally within the fuel cell, is employed to reform, by the use of steam, oxygen, or carbon dioxide (in an endothermic reaction), the fossil fuels into non-complex reactant gases.

Figure 13:
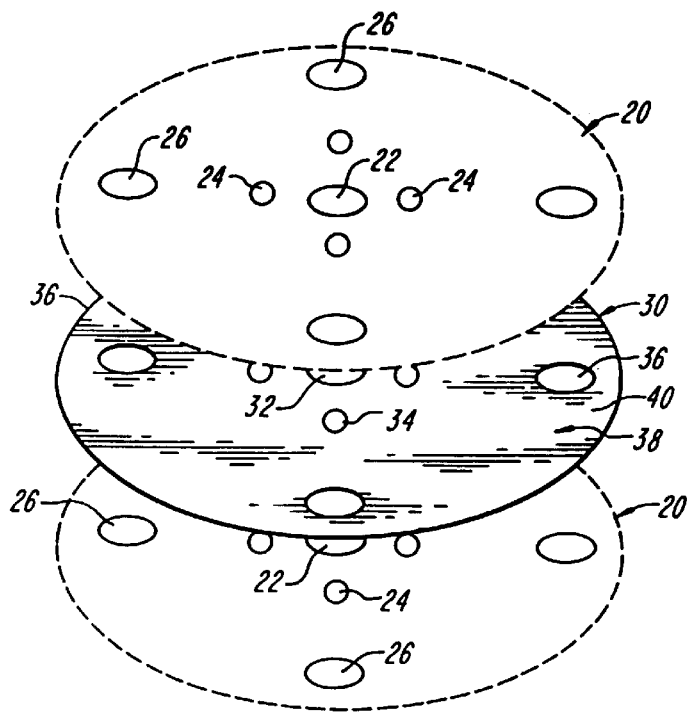
FIG. 13 is a perspective view of a basic cell unit of an electrochemical converter of the invention.
Figure 14:
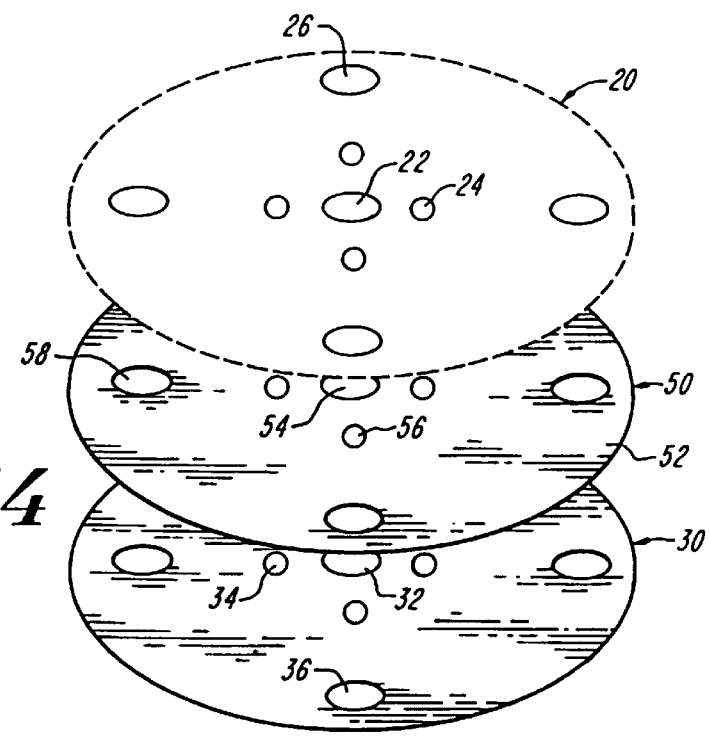
FIG. 14 is a perspective view of an alternate embodiment of the basic cell unit of the electrochemical converter of the present invention.
Figure 15:
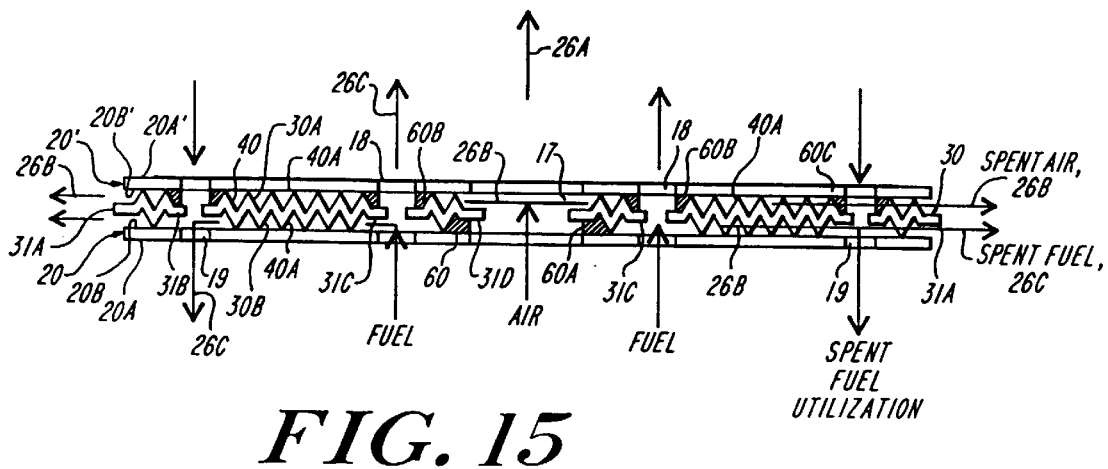
FIG. 15 is a cross-sectional view of the cell unit of FIG. 12.

FIGS. 13 through 15 illustrate the basic cell unit 10 of the electrochemical converter 72, which is particularly suitable for integration with conventional gas turbines. The cell unit 10 includes an electrolyte plate 20 and an interconnector plate 30. In one embodiment, the electrolyte plate 20 can be made of a ceramic, such as a stabilized zirconia material $ZrO_2(Y_2O_3)$, on which a porous oxidizer electrode material 20A and a porous fuel electrode material 20B are disposed thereon. Exemplary materials for the oxidizer electrode material are perovskite materials, such as $LaMnO_3(Sr)$. Exemplary materials for the fuel electrode material are cermets such as $ZrO_2/Ni$ and $ZrO_2/NiO$.

The interconnector plate 30 preferably is made of an electrically and thermally conductive interconnect material. Examples of such material include nickel alloys, platinum alloys, non-metal conductors such as silicon carbide, $La(Mn)CrO_3$, send preferably commercially available Inconel, manufactured by Inco., U.S.A. The interconnector plate 30 serves as the electric connector between adjacent electrolyte plates and as a partition between the fuel and oxidizer reactants. As best shown in FIG. 15, the interconnector plate 30 has a central aperture 32 and a set of intermediate, concentric radially outwardly spaced apertures 34. A third outer set of apertures 36 are disposed along the outer cylindrical portion or periphery of the plate 30.

The interconnector plate 30 has a textured surface 38. The textured surface preferably has formed thereon a series of dimples 40, as shown in FIG. 15, which form a series of connecting reactant-flow passageways. Preferably, both sides of the interconnector plate 30 have the dimpled surface formed thereon. Although the intermediate and outer set of apertures 34 and 36, respectively, are shown with a selected number of apertures, those of ordinary skill will recognize that any number of apertures or distribution patterns can be employed, depending upon the system and reactant-flow requirements.

Likewise, the electrolyte plate 20 has a central aperture 22, and a set of intermediate and outer apertures 24 and 26 that are formed at locations complementary to the apertures 32, 34 and 36, respectively, of the interconnector plate 30.

Referring to FIG. 14, a spacer plate 50 can be interposed between the electrolyte plate 20 and the interconnector plate 30. The spacer plate 50 preferably has a corrugated surface 52 that forms a series of connecting reactant-flow passageways, similar to the interconnecting plate 30. The spacer plate 50 also has a number of concentric apertures 54, 56, and 58 that are at locations complementary to the apertures of the interconnect and electrolyte plates, as shown. Further, in this arrangement, the interconnector plate 30 is devoid of reactant-flow passageways. The spacer plate 50 is preferably made of an electrically conductive material, such as nickel.

The illustrated electrolyte plates 20, interconnector plates 30, and spacer plates 50 can have any desirable geometric configuration. Furthermore, the plates having the illustrated manifolds can extend outwardly in repetitive or non-repetitive patterns, and thus are shown in dashed lines.

Referring to FIG. 15, when the electrolyte plates 20 and the interconnector plates 30 are alternately stacked and aligned along their respective apertures, the apertures form axial (with respect to the stack) manifolds that feed the cell unit with the input reactants and that exhaust spent fuel. In particular, the aligned central apertures 22,32,22' form input oxidizer manifold 17, the aligned concentric apertures 24,34,24' form input fuel manifold 18, and the aligned outer apertures 26,36,26' form spent fuel manifold 19.

The dimpled surface 38 of the interconnector plate 30 has, in the cross-sectional view of FIG. 15, a substantially corrugated pattern formed on both sides. This corrugated pattern forms the reactant-flow passageways that channel the input reactants towards the periphery of the interconnector plates. The interconnector plate also has an extended heating surface or lip structure that extends within each axial manifold and about the periphery of the interconnector plate. Specifically, the interconnector plate 30 has a flat annular extended surface 31A formed along its outer peripheral edge. In a preferred embodiment, the illustrated heating surface 31A extends beyond the outer peripheral edge of the electrolyte plate 20. The interconnector plate further has an extended heating surface that extends within the axial manifolds, for example, edge 31B extends into and is housed within the axial manifold 19; edge 31C extends into and is housed within the axial manifold 18; and edge 31D extends into and is housed within the axial manifold 17. The extended heating surfaces can be integrally formed with the interconnector plate or can be coupled or attached thereto. The heating surface need not be made of the same material as the interconnector plate, but can comprise any suitable thermally conductive material that is capable of withstanding the operating temperature of the electrochemical converter. In an alternate embodiment, the extended heating surface can be integrally formed with or coupled to the spacer plate.

The absence of a ridge or other raised structure at the interconnector plate periphery provides for exhaust ports that communicate with the external environment. The reactant-flow passageways connect, fluidwise, the input reactant manifolds with the outer periphery, thus allowing the reactants to be exhausted to the external environment, or to a thermal container or pressure vessel disposed about the electrochemical converter, FIG. 12.

Referring again to FIG. 15, the illustrated sealer material 60 can be applied to portions of the interconnector plate 30 at the manifold junctions, thus allowing selectively a particular input reactant to flow across the interconnector surface and across the mating surface of the electrolyte plate 20. The interconnector plate bottom 30B contacts the fuel electrode coating 20B of the electrolyte plate 20. In this arrangement, it is desirable that the sealer material only allow fuel reactant to enter the reactant-flow passageway, and thus contact the fuel electrode.

As illustrated, the sealer material 60A is disposed about the input oxidizer manifold 17, forming an effective reactant flow barrier about the oxidizer manifold 17. The sealer material helps maintain the integrity of the fuel reactant contacting the fuel electrode side 20B of the electrolyte plate 20, as well as maintain the integrity of the spent fuel exhausted through the spent fuel manifold 19.

The top 30A of the interconnector plate 30 has the sealer material 60B disposed about the fuel input manifolds 18 and the spent fuel manifold 19. The top of the interconnector plate 30A contacts the oxidizer coating 20B' of an opposing electrolyte plate 20'. Consequently, the junction at the input oxidizer manifold 17 is devoid of sealer material, thereby allowing the oxidizer reactant to enter the reactant-flow passageways. The sealer material 60B that completely surrounds the fuel manifolds 18 inhibits the excessive leakage of the fuel reactant into the reactant-flow passageways, thus inhibiting the mixture of the fuel and oxidizer reactants. Similarly, the sealer material 60C that completely surrounds the spent fuel manifold 19 inhibits the flow of spent oxidizer reactant into the spent fuel manifold 19. Hence, the purity of the spent fuel that is pumped through the manifold 19 is maintained.

Referring again to FIG. 15, the oxidizer reactant can be introduced to the electrochemical converter through axial manifold 17 that is formed by the apertures 22, 32, and 22' of the electrolyte and interconnector plates, respectively. The oxidizer is distributed over the top of the interconnector plate 30A, and over the oxidizer electrode surface 20A' by the reactant-flow passageways. The spent oxidizer then flows radially outward toward the peripheral edge 31A, and is finally discharged along the converter element periphery. The sealer material 60C inhibits the flow of oxidizer into the spent fuel manifold 19. The flow path of the oxidizer through the axial manifolds is depicted by solid black arrows 26A, and through the oxidizer cell unit by the solid black arrows 26B.

The fuel reactant is introduced to the electrochemical converter 10 by way of fuel manifold 18 formed by the aligned apertures 24, 34, and 24' of the plates. The fuel is introduced to the reactant-flow passageways and is distributed over the bottom of the interconnector plate 30B, and over the fuel electrode coating 20B of the electrolyte plate 20. Concomitantly, the sealer material 60A prevents the input oxidizer reactant from entering the reactant-flow passageways and thus mixing with the pure fuel/spent fuel reactant mixture. The absence of any sealer material at the spent fuel manifold 19 allows spent fuel to enter the manifold 19. The fuel is subsequently discharged along the annular edge 31A of the interconnector plate 30. The flow path of the fuel reactant is illustrated by the solid black arrows 26C.

The dimples 40 of the interconnector surface have an apex 40A that contact the electrolyte plates, in assembly, to establish an electrical connection therebetween.

A wide variety of conductive materials can be used for the thin electroconnector plates of this invention. Such materials should meet the following requirements: (1) high strength, as well as electrical and thermal conductivity; (2) good oxidation resistance up to the working temperature; (3) chemical compatibility and stability with the input reactants; and (4) manufacturing economy when formed into the textured plate configuration exemplified by reactant-flow passageways.

The suitable materials for interconnector fabrication include nickel alloys, nickel-chromium alloys, nickel-chromium-iron alloys, iron-chromium-aluminum alloys, platinum alloys, cermets of such alloys and refractory material such as zirconia or alumina, silicon carbide and molybdenum disilicide.

The textured patterns of the top and bottom of the interconnector plate can be obtained, for example, by stamping the metallic alloy sheets with one or more sets of matched male and female dies. The dies are preferably prefabricated according to the desired configuration of the interconnector plate, and can be hardened by heat treatment to withstand the repetitive compressing actions and mass productions, as well as the high operating temperatures. The stamp forming process for the interconnectors is preferably conducted in multiple steps due to the geometrical complexity of the gas passage networks, e.g., the dimpled interconnector plate surface. The manifolds formed in the interconnector plates are preferably punched out at the final step. Temperature annealing is recommended between the consecutive steps to prevent the overstressing of sheet material. The stamping method is capable of producing articles of varied and complex geometry while maintaining uniform material thickness.

Alternatively, corrugated interconnectors can be formed by electrodeposition on an initially flat metal plate using a set of suitable masks. Silicon carbide interconnector plates can be formed by vapor deposition onto pre-shaped substrates, by sintering of bonded powders, or by self-bonding processes.

The oxidizer and fuel reactants are preferably preheated to a suitable temperature prior to entering the electrochemical converter. This preheating can be performed by any suitable heating structure, such as a regenerative heat exchanger or a radiative heat exchanger, for heating the reactants to a temperature sufficient to reduce the amount of thermal stress applied to the converter.

A significant feature of the present invention is that the hybrid power systems illustrated in FIGS. 8–11, 16 and 17 unexpectedly operate at system efficiencies that exceed any that were previously known. Another significant feature of the present invention is that the extended heating surfaces 31D and 31C heat the reactants contained within the oxidizer and fuel manifolds 17 and 18 to the operating temperature of the converter. Specifically, the extended surface 31D that protrudes into the oxidizer manifold 17 heats the oxidizer reactant, and the extended surface 31C that protrudes into the fuel manifold 18 heats the fuel reactant. The highly thermally conductive interconnector plate 30 facilitates heating of the input reactants by conductively transferring heat from the fuel cell internal surface, e.g., the middle region of the conductive interconnector plate, to the extended surfaces or lip portions, thus heating the input reactants to the operating temperature prior to traveling through reactant flow passageways. The extended surfaces thus function as a heat fin. This reactant heating structure provides a compact converter that is capable of being integrated with an electricity generating power system, and further provides a highly efficient system that is relatively low in cost. Electrochemical converters incorporating fuel cell components constructed according to these principles and employed in conjunction with a gas turbine provides a power system having a relatively simple system configuration.

The operating temperature of the electrochemical converter is preferably between about 20° C. and 1500° C., and the preferred fuel cell types employed by the present invention are solid oxide fuel cells, molten carbonate fuel cells, alkaline fuel cells, phosphoric acid fuel cells, and proton membrane fuel cells.

In an alternate embodiment, the electrolyte and interconnector plates can have a substantially tubular shape and have an oxidizer electrode material disposed on one side and a fuel electrode material disposed on the opposing side. The plates can then be stacked together in a like manner.

It will thus be seen that the invention contains improvements over the prior art. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween. For example, the electrochemical converter employing the interconnector plate edge extensions of the present invention can also employ molten carbonate, phosphoric acid, alkaline and proton exchange membrane electrochemical converters and other like converters.

What is claimed is:

1. A fuel cell power system for producing electricity, comprising
   an assembly of fuel cell stacks adapted for operating at different operating temperatures, wherein said operating temperatures vary between two or more of said fuel cell stacks in said assembly, and
   wherein each said fuel cell stacks include means for receiving reactants for electrochemically producing electricity.

2. The system of claim 1, wherein said assembly of fuel cell stacks is adapted for operating temperatures in the range between about 20° C. and about 2000° C.

3. The system of claim 1, wherein said assembly comprises two or more fuel cell stacks selected from the group consisting of a solid oxide fuel cell, solid state fuel cell, molten carbonate fuel cell, phosphoric acid fuel cell, alkaline fuel cell, and proton exchange membrane fuel cell.

4. The system of claim 1, wherein each said fuel cell stack comprises a solid state or solid oxide including at least one of yttria stabilized zirconia, a lanthanum gallate, a ceria based oxide, a bismuth based oxides, and a composite of the foregoing materials.

5. The system of claim 1, wherein the fuel cell stack comprises
   a plurality of electrolyte plates having an oxidizer electrode material on one side and a fuel electrode material on the opposing side,
   a plurality of interconnector plates for providing electrical contact with the electrolyte plates, wherein the fuel cell stack is assembled by alternately stacking interconnector plates with the electrolyte plate, and
   a plurality of manifolds axially associated with the stack and adapted to receive the reactants.

6. The system of claim 5, further comprising reactant heating means for heating one or more of the reactants, said reactant heating means including a thermally conductive and integrally formed extended surface of the interconnector plate that protrudes into the axial manifolds.

7. The system of claim 1, wherein said fuel cell stack has a cylindrical or rectangular cross-sectional shape.

8. The system of claim 1, wherein said fuel cell stack comprises an array of tubular shaped fuel cells.

9. The system of claim 1, further comprising one or more manifolds, disposed external or internal to said fuel cell stacks, for carrying fluid to or from said fuel cell stacks.

10. The system of claim 1, further comprising means for introducing said reactants to said fuel cell stack.

11. The system of claim 1, further comprising means for fluidly coupling together one or more of said fuel cell stacks in said assembly.

12. The system of claim 1, further comprising means for fluidly coupling said fuel cell stacks in series relative to a reactant flow direction.

13. The system of claim 1, further comprising means for fluidly coupling said fuel cell stacks in parallel relative to a reactant flow direction.

14. The system of claim 1, further comprising means for coupling the exhaust of one of said fuel cell stacks to another fuel cell stack, wherein said fuel cell exhaust of said one fuel cell stack is introduced into the other fuel cell stack.

15. The system of claim 1, further comprising a gas-tight enclosure disposed about one or more of said fuel cell stacks of said assembly, said gas-tight enclosure being adapted to collect exhaust from said fuel cell stack.

16. The system of claim 1, wherein said assembly of fuel cell stacks comprises a first fuel cell stack adapted to generate exhaust at a first operating temperature, and a second fuel cell stack coupled to said first fuel cell stack to receive said exhaust and adapted to heat said exhaust to a second operating temperature higher than said first operating temperature.

17. The system of claim 16, further comprising
   a fuel supply for supplying fuel to at least one of said first and second fuel cell stacks,
   an oxidizer supply for supplying oxidizer to said first fuel cell stack, and
   means for coupling said exhaust from said first fuel cell stack to said second fuel cell stack, said exhaust being introduced thereto as said oxidizer.

18. The system of claim 16, wherein said second fuel cell stack is adapted to heat said exhaust to said second operating temperature, said exhaust being coupled to a third fuel cell stack having a third operating temperature higher than said second operating temperature.

19. The system of claim 1, further comprising means for serially coupling together a selected number of fuel cell stacks to heat a fluid from a first temperature to a selected temperature, said number of fuel cell stacks being chosen as a function of said selected temperature.

20. The system of claim 1, further comprising a fuel supply for supplying fuel to one or more of said fuel cell stacks.

21. The system of claim 20, further comprising control means for controlling the amount of fuel supplied to said fuel cell stacks.

22. The system of claim 21, wherein said control means comprises a valve or orifice for controlling fuel flow.

23. The system of claim 22, wherein said control means further comprises a controller coupled to the valve for automatically controlling the amount of fuel supplied to the fuel cell stack.

24. The system of claim 1, wherein one or more of said fuel cell stacks of said assembly have varied reforming characteristics as a function of said operating temperature.

25. The system of claim 1, wherein said assembly of fuel cell stacks is arranged to form upper fuel cell stacks and lower fuel cell stacks, wherein said upper fuel cell stacks are composed of a material suitable for operation at a first operating temperature, and said lower fuel cell stacks are composed of a material suitable for operation at a second lower operating temperature.

26. The system of claim 25, her comprising a gas-tight enclosure disposed about said assembly such that said lower fuel cell stacks are disposed closer to a support structure relative to said upper fuel cell stacks, wherein said operating temperatures of said lower fuel cell stacks are different than said operating temperature of said upper fuel cell stacks.

27. The system of claim 1, wherein said assembly of fuel cell stacks is arranged to form inner fuel cell stacks and outer fuel cell stacks, wherein said outer fuel cell stacks are composed of a material suitable for operation at a first operating temperature, and said inner fuel cell stacks are composed of a material suitable for operation at a second higher operating temperature.

28. The system of claim 1, wherein said assembly of fuel cell stacks are disposed within a thermal enclosure, said outer fuel cell stacks of said assembly being spaced closer to an inner wall of said thermal enclosure relative to inner fuel cell stacks of said assembly, and wherein said operating temperatures of said outer fuel cell stacks are lower than said operating temperature of said inner fuel cell stacks.

29. The system of claim 1, wherein one or more of said fuel cell stacks of said assembly comprises multiple axially adjacent temperature regions along said stack, each said region operating at a different operating temperature.

30. The system of claim 29, wherein said fuel cell stack further comprises a fuel manifold for receiving a fuel reactant and an oxidizer manifold for receiving an oxidizer reactant.

31. The system of claim 30, further comprising a gas-tight enclosure disposed about said fuel cell stack for collecting exhaust from said fuel cell stack.

32. The system of claim 31, further comprising a fluid blocking element disposed in said fuel cell stack and positioned at a location to selectively occlude one of said manifolds, for preventing passage of said corresponding reactant within the manifold at said location.

33. The system of claim 32, wherein said fluid blocking element is disposed within said oxidizer manifold, and wherein said fuel cell stack emits exhaust about at least a portion of the periphery of one temperature region, said gas-tight enclosure reintroducing said exhaust to said adjacent temperature region at said periphery and into said oxidizer manifold.

34. The system of claim 32, wherein said fluid blocking element is disposed at the junction between said temperature regions.

35. The system of claim 32, wherein said fuel cell stack comprises first and second adjacent temperature regions, wherein said first temperature regions is formed of a first material and adapted to operate at a first operational temperature, and said second region is formed of a second material and adapted to operate at a second operational temperature different than said first operational temperature, said fluid blocking element being disposed at the junction of said first and second regions.

36. The system of claim 1, wherein said assembly comprises two or more fuel cell stacks forming separate spatially separated fuel cells that operate at different operating temperatures.

37. The system of claim 36, further comprising a gas-tight enclosure disposed about at least one of said fuel cell stacks of said assembly, said gas-tight enclosure adapted to collect exhaust from said fuel cell stack.

38. The system of claim 37, further comprising means for coupling the exhaust of one of said fuel cell stacks to the other spatially separated fuel cell stack, wherein said fuel cell exhaust of said one fuel cell stack is introduced into the other fuel cell stack.

39. The system of claim 37, wherein said assembly of fuel cell stacks comprises a first fuel cell stack adapted to generate exhaust at a first operating temperature, and a second fuel cell stack coupled to said first fuel cell stack to receive said exhaust and adapted to heat said exhaust to a second operating temperature higher than said first operating temperature.

40. The system of claim 39, further comprising means for coupling said exhaust from said first fuel cell stack to said second fuel cell stack, said exhaust being introduced thereto as an oxidizer reactant.

41. The system of claim 1, further comprising one or more compressors associated with one or more of said fuel cell stacks of said assembly for compressing one of said reactants, and one or more turbines associated with said one or more fuel cell stacks and adapted to receive exhaust produced thereby, wherein the turbine converts the exhaust into rotary energy.

42. The system of claim 41, further comprising a steam generator associated with the gas turbine and adapted to receive the gas turbine exhaust, the steam generator coupling the exhaust of the gas turbine to a working medium.

43. The system of claim 42, further comprising a steam turbine associated with the steam generator and configured for producing electricity.

44. The system of claim 41, further comprising an electric generator associated with the turbine and adapted to receive the rotary energy thereof, wherein the generator produces electricity in response to the turbine rotary energy.

45. A method of producing electricity with a fuel cell power system, comprising the steps of providing an assembly of fuel cell stacks, operating at least a portion of said fuel cell stacks at different operating temperatures, wherein said operating temperatures vary between two or more of said fuel cell stacks in said assembly, and introducing reactants to said fuel cell stacks for electro-chemically producing electricity.

46. The method of claim 45, further comprising the step of operating said assembly of fuel cell stacks in the range between about 20° C. and about 2000° C.

47. The method of claim 45, further comprising the step of selecting two or more of said fuel cell stacks from the group consisting of a solid oxide fuel cell, solid state fuel cell, molten carbonate fuel cell, phosphoric acid fuel cell, alkaline fuel cell, and proton exchange membrane fuel cell.

48. The method of claim 45, further comprising the step of forming said fuel cell stack from at least one of yttria stabilized zirconia, a lanthanum gallate, a ceria based oxide, a bismuth based oxides, and a composite of the foregoing materials.

49. The method of claim 45, further comprising the step of forming the fuel cell stack from a plurality of electrolyte plates having an oxidizer electrode material on one side and a fuel electrode material on the opposing side, a plurality of interconnector plates for providing electrical contact with the electrolyte plates, wherein the fuel cell stack is assembled by alternately stacking interconnector plates with the electrolyte plate, and a plurality of manifolds axially associated with the stack and adapted to receive the reactants.

50. The method of claim 49, further comprising the step of forming a thermally conductive and integrally formed extended surface of the interconnector plate that protrudes into the axial manifolds for heating one or more of the reactants.

51. The method of claim 45, further comprising the step of providing a cylindrical or rectangular cross-sectional shape fuel cell stack.

52. The method of claim 45, further comprising the step of providing an array of tubular shaped fuel cell stacks.

53. The method of claim 45, further comprising the step of providing one or more manifolds, disposed external or internal to said fuel cell stacks, for carrying fluid to or from said fuel cell stacks.

54. The method of claim 45, further comprising the step of fluidly coupling said fuel cell stacks in series or parallel relative to a reactant flow direction.

55. The method of claim 45, further comprising the step of coupling the exhaust of one of said fuel cell stacks to another fuel cell stack, wherein said fuel cell exhaust of said one fuel cell stack is introduced into the other fuel cell stack.

56. The method of claim 45, further comprising the step of disposing a gas-tight enclosure about one or more of said fuel cell stacks of said assembly, said gas-tight enclosure being adapted to collect exhaust from said fuel cell stack.

57. The method of claim 45, further comprising the steps of
providing a first fuel cell stack adapted to generate exhaust at a first operating temperature, and
providing a second fuel cell stack coupled to said first fuel cell stack to receive said exhaust and adapted to heat said exhaust to a second operating temperature higher than said first operating temperature.

58. The method of claim 57, further comprising the step of coupling said exhaust from said second fuel cell stack to a third fuel cell stack having a third operating temperature higher than said second operating temperature.

59. The method of claim 57, further comprising the steps of
supplying fuel to at least one of said first and second fuel cell stacks,
supplying oxidizer to said first fuel cell stack, and
coupling said exhaust from said first fuel cell stack to said second fuel cell stack, said exhaust being introduced thereto as said oxidizer reactant.

60. The method of claim 45, further comprising the step of serially coupling together a selected number of fuel cell stacks to heat a fluid from a first temperature to a selected temperature, said number of fuel cell stacks being chosen as a function of said selected temperature.

61. The method of claim 45, further comprising the step of controlling the amount of fuel supplied to said fuel cell stacks.

62. The method of claim 61, wherein said step of controlling further comprises the step of providing a valve or orifice for controlling fuel flow.

63. The method of claim 45, further comprising the step of varying the reforming characteristics of one or more of said fuel cell stacks of said assembly as a function of said operating temperature.

64. The method of claim 45, further comprising the steps of
arranging said assembly of fuel cell stacks to form upper fuel cell stacks, and lower fuel cell stacks,
forming said upper fuel cell stacks from a material suitable for operation at a first operating temperature, and
forming said lower fuel cell stacks from a material suitable for operation at a second lower operating temperature.

65. The method of claim 64, further comprising the step of disposing a gas-tight enclosure about said assembly such that said lower fuel cell stacks are disposed closer to a support structure relative to said upper fuel cell stacks, wherein said operating temperatures of said lower fuel cell stacks are different than said operating temperature of said upper fuel cell stacks.

66. The method of claim 65, further comprising the steps of
arranging said assembly of fuel cell stacks to form inner fuel cell stacks and outer fuel cell stacks,
forming said outer fuel cell stacks from a material suitable for operation at a first operating temperature, and
forming said inner fuel cell stacks from a material suitable for operation at a second higher operating temperature.

67. The method of claim 45, further comprising the step of disposing said assembly of fuel cell stacks within a thermal enclosure, said outer fuel cell stacks of said assembly being spaced closer to an inner wall of said thermal enclosure relative to inner fuel cell stacks of said assembly, wherein said operating temperatures of said outer fuel cell stacks are lower than said operating temperature of said inner fuel cell stacks.

68. The method of claim 45, further comprising the step of forming multiple axially adjacent temperature regions along said stack, each said region operating at a different operating temperature.

69. The method of claim 68, further comprising the step of providing a fuel manifold for receiving a fuel reactant and an oxidizer manifold for receiving an oxidizer reactant.

70. The method of claim 69, further comprising the step of disposing a gas-tight enclosure about said fuel cell stack for collecting exhaust from said fuel cell stack.

71. The method of claim 70, further comprising the step of positioning a fluid blocking element in said fuel cell stack at a location to selectively occlude one of said manifolds, thereby preventing passage of said corresponding reactant within the manifold at said location.

72. The method of claim 71, further comprising the steps of
disposing said fluid blocking element within said oxidizer manifold,
emitting exhaust about at least a portion of the periphery of one temperature region, and
reintroducing said exhaust to said adjacent temperature region at said periphery and into said oxidizer manifold.

73. The method of claim 71, further comprising the step of disposing said fluid blocking element at the junction between said temperature regions.

74. The method of claim 71, wherein said fuel cell stack comprises the step of providing first and second adjacent temperature regions, wherein said first temperature regions are formed of a first material and adapted to operate at a first operational temperature, and said second region is formed of a second material and adapted to operate at a second operational temperature different than said first operational temperature, said fluid blocking element being disposed at the junction of said first and second regions.

75. The method of claim 45, wherein said assembly comprises the step of providing two or more fuel cell stacks forming separate, spatially separated fuel cells that operate at different operating temperatures.

76. The method of claim 75, further comprising the step of disposing a gas-tight enclosure about at least one of said fuel cell stacks of said assembly, said gas-tight enclosure being adapted to collect exhaust from said fuel cell stack.

77. The method of claim 76, further comprising the step of coupling the exhaust of one of said fuel cell stacks to the other spatially separated fuel cell stack, wherein said fuel cell exhaust of said one fuel cell stack is introduced into the other fuel cell stack.

78. The method of claim 76, wherein said assembly of fuel cell stacks comprises the step of providing a first fuel cell stack adapted to generate exhaust at a first operating temperature, and a second fuel cell stack coupled to said first fuel cell stack to receive said exhaust and adapted to heat said exhaust to a second operating temperature higher than said first operating temperature.

79. The method of claim 78, further comprising the step of coupling said exhaust from said first fuel cell stack to said second fuel cell stack, said exhaust being introduced thereto as an oxidizer reactant.

80. The method of claim 45, further comprising the step of providing one or more compressors associated with one or more of said fuel cell stacks of said assembly for compressing one of said reactants, and one or more turbines associated with said one or more fuel cell stacks and adapted to receive exhaust produced thereby, wherein the turbine converts the exhaust into rotary energy.

81. The method of claim 80, further comprising the step of providing a steam generator associated with the gas turbine and adapted to receive the gas turbine exhaust, the steam generator coupling the exhaust of the gas turbine to a working medium.

82. The method of claim 81, further comprising the step of providing a steam turbine associated with the steam generator and configured for producing electricity.

83. The method of claim 80, further comprising the step of providing an electric generator associated with the turbine and adapted to receive the rotary energy thereof, wherein the generator produces electricity in response to the turbine rotary energy.

* * * * *